US005679890A

United States Patent [19]

[11] Patent Number: 5,679,890
[45] Date of Patent: Oct. 21, 1997

Shinohara et al.

[54] FAULT DIAGNOSTIC APPARATUS FOR EVAPORATED FUEL PURGING SYSTEM

[75] Inventors: Susumu Shinohara; Katsuhiko Teraoka, both of Toyota, Japan

[73] Assignee: Toyota Jidosha Kabushiki Kaisha, Aichi, Japan

[21] Appl. No.: 624,009

[22] Filed: Mar. 27, 1996

[30] Foreign Application Priority Data

Mar. 29, 1995 [JP] Japan .................................... 7-071807

[51] Int. Cl.[6] .......................... F02M 25/08; F02B 77/08; G01M 15/00

[52] U.S. Cl. ........................ 73/118.1; 73/40.5 R; 73/49.7; 73/115; 73/116; 123/519

[58] Field of Search .......................... 73/115, 116, 117.2, 73/117.3, 118.1, 118.2, 40.5 R, 49.7; 123/518, 519, 520, 521

[56] References Cited

U.S. PATENT DOCUMENTS

| | | | |
|---|---|---|---|
| 5,267,470 | 12/1993 | Cook | 73/49.7 |
| 5,275,144 | 1/1994 | Gross | 73/118.1 |
| 5,284,050 | 2/1994 | Iida et al. | 73/118.1 |
| 5,327,776 | 7/1994 | Yasui et al. | 73/118.1 |
| 5,408,866 | 4/1995 | Kawamura et al. | 73/49.7 |
| 5,425,266 | 6/1995 | Fournier | 73/49.7 |
| 5,526,675 | 6/1996 | Ratton | 73/118.1 |

FOREIGN PATENT DOCUMENTS

| | | |
|---|---|---|
| 6-26408 | 2/1994 | Japan . |
| 6-66212 | 3/1994 | Japan . |
| 6-74104 | 3/1994 | Japan . |
| 6-108932 | 4/1994 | Japan . |

*Primary Examiner*—George M. Dombroske
*Attorney, Agent, or Firm*—Kenyon & Kenyon

[57] ABSTRACT

The fault diagnostic apparatus of the present invention detects a failure (a leak) of a fuel tank of an engine. In this invention, space above the fuel level in the fuel tank is connected to a canister. The canister contains an adsorbent to adsorb evaporated fuel in the tank to prevent the evaporated fuel from being released to the atmosphere. Valves are provided to the canister to keep the internal pressure of the canister within a predetermined range. A control circuit of the engine employs a pressure sensor to monitor the internal pressure of the fuel tank, and determines whether the fuel tank has failed in accordance with a change in the internal pressure of the fuel tank. Since the change in the fuel level in the fuel tank varies in accordance with the fuel consumption rate, the change in the pressure in the fuel tank also varies in accordance with the fuel consumption rate. Therefore, the control circuit stops the determining operation when the fuel consumption rate of the engine is too large or too small, to avoid an error in the diagnosis of the fuel tank.

9 Claims, 19 Drawing Sheets

FAULT DIAGNOSTIC APPARATUS FOR EVAPORATED FUEL PURGING SYSTEM

BACKGROUND OF THE INVENTION

1. Field of the Invention

The present invention relates to an evaporative emission control system (hereinafter referred to as an "evaporated fuel purging system") for preventing an emission of evaporated fuel from a fuel tank into the atmosphere, and particularly, to a fault diagnostic apparatus for the evaporated fuel purging system.

2. Description of the Related Art

To prevent a release of evaporated fuel from a fuel tank of an engine into the atmosphere, a canister incorporating an adsorbent is used to adsorb the evaporated fuel. When the engine is operated under given conditions, air is passed through the canister to release the adsorbed fuel from the adsorbent. A mixed gas of the air and released fuel is purged from the canister into an intake duct of the engine and is burned by the engine.

If this system fails, the evaporated fuel leaks out and pollutes the atmosphere.

For example, if the air tightness of the fuel tank is lost, i.e., if the fuel tank leaks, evaporated fuel will be directly released to the atmosphere through the leak. The leak of the fuel tank, however, causes no trouble on the operation of the engine, and therefore, the driver will not notice the leakage and continue driving.

Various apparatuses have been proposed to diagnose an evaporated fuel purging system and, in particular, a fuel tank, and inform a driver of trouble if any.

An example of the diagnosis apparatus of this kind is disclosed in Japanese Unexamined Patent Publication No. 6-26408.

In this disclosure, the apparatus determines that a fuel tank has a leak if the internal pressure of the fuel tank does not exceed a given pressure within a given period after the engine starts.

A vapor path extending from the fuel tank has a valve device such as an internal pressure control valve. When the internal pressure of the fuel tank increases above a positive set value or drops below a negative set value, the valve opens to connect the fuel tank to a canister. When the internal pressure of the fuel tank is between the positive and negative set values, the fuel tank is closed. After the engine is started, a fuel pump draws fuel from the tank, and therefore, the level of fuel in the tank decreases and, thereby the internal pressure of the tank drops. When a certain time has elapsed after the engine starts, surplus fuel at a high temperature begins to return from a fuel injector to the fuel tank, and at the same time, the fuel tank receives heat from an exhaust system. As a result, the temperature of fuel in the tank increases and, thereby the vapor pressure of the fuel in the tank increases. This causes the internal pressure of the fuel tank to increase.

Therefore, if the fuel tank has no leak, the internal pressure of the fuel tank temporarily drops after the engine is started and then increases close to the set pressure of the internal pressure control valve.

If the fuel tank has a leak, i.e., if the fuel tank has failed, since the inside of the tank always communicates with the atmosphere, the pressure of the fuel tank stays around atmospheric pressure even after the engine is started. The apparatus in the '408 publication detects a change in the pressure of the fuel tank, and if it stays within a given period after the start of the engine, determines that the fuel tank has a leak.

However, when the evaporated fuel purging system is diagnosed in accordance with the internal pressure of the fuel tank after the start of the engine as in the Japanese Unexamined Patent Publication No. 6-26408, an error may be involved in the diagnosis.

For example, if the fuel tank is normal, since the fuel level in the fuel tank goes down due to consumption of the fuel by the engine, the internal pressure of the fuel tank temporarily usually drops after the start of the engine. However, if the engine is operated in an idle condition for a long time after the start of the engine, the fuel consumption of the engine is very small. In this case, the pressure drop in the fuel tank after the start of the engine becomes small. Therefore, since the apparatus in the '408 publication diagnoses the system by checking the pressure drop in the fuel tank, it may incorrectly determine that the fuel tank has a leak because of the small pressure drop in the fuel tank.

Further, though the internal pressure of the fuel tank usually increases a certain time after the start of the engine because of the temperature rise of the fuel in the fuel tank due to the heat of the returned fuel and of the exhaust system, if the engine is operated under heavy load in this period, the engine consumes a large amount of fuel and the fuel level in the fuel tank drops rapidly. In this case, the pressure of the fuel tank may increase only slightly. Since the apparatus in the '408 publication checks for an increase in the pressure of the fuel tank a certain time after the start of the engine, it may incorrectly determine that the fuel tank has a leak because of the small increase in the pressure.

Further, valve opening pressure of the internal pressure control valve for maintaining the pressure of the fuel tank within a given range is usually set around atmospheric pressure. Accordingly, the change in the pressure of the fuel tank after the start of the engine is relatively small even if the tank has no leak. The diagnosis, therefore, must be carried out using a relatively small pressure change. This means that the accuracy of the diagnosis is greatly affected by a temperature change during the detection of a pressure and a measurement tolerance of a pressure sensor and, in some cases, these factors can deteriorate the reliability of the diagnosis.

SUMMARY OF THE INVENTION

In view of the problems of the related art set forth above, an object of the present invention is to provide a fault diagnostic apparatus for an evaporated fuel purging system which is capable of correctly diagnosing a fuel tank according to the internal pressure thereof.

The above-mentioned object is achieved by a fault diagnostic apparatus for an evaporated fuel purging system according to the present invention, in which the apparatus comprises a vapor path connecting a space above a fuel level in a fuel tank of an internal combustion engine to an intake duct of the engine, a purging unit disposed in the vapor path for purging evaporated fuel in the fuel tank into an intake duct through the vapor path, an internal pressure control valve arranged in the vapor path between the purge unit and the fuel tank, for opening when the internal pressure of the fuel tank increases above a predetermined pressure higher than atmospheric pressure, to thereby keep the internal pressure of the fuel tank below the predetermined pressure, pressure detecting means for detecting the internal pressure of the fuel tank, failure determining means for performing a determining operation for determining whether the fuel tank has failed according to the internal pressure of the fuel tank detected by the detecting means after the engine is started, fuel consumption detecting means for detecting the amount of fuel consumed by the engine after the start of the engine, and control means for controlling the determining operation of the determining means in accordance with the fuel consumption detected by the fuel consumption detecting means.

The fuel consumption of the engine is one of the factors affecting the accuracy of the diagnosis as explained before. In this aspect of the invention, the determining operation based on the internal pressure of the fuel tank is carried out in accordance with the fuel consumption of the engine. Therefore, the error caused by the difference in the fuel consumption can be eliminated. For example, when the fuel consumption of the engine after the engine starts is small, the diagnosis of the fuel tank is prohibited in one aspect of the present invention, to thereby prevent the error caused by the small pressure drop in the fuel tank due to small fuel consumption. In another aspect of the present invention, the diagnosis of the fuel tank is prohibited when the fuel consumption of the engine is large. Therefore, the error in the diagnosis caused by the small pressure rise in the fuel tank due to large fuel consumption can be prevented. Further, in another aspect of the present invention, the reference value of the failure determination parameter on which the apparatus diagnoses the system is changed in accordance with the fuel consumption of the engine. Therefore, an appropriate reference value is set in accordance with the fuel consumption and, thereby the diagnosis is not affected by the variation in the fuel consumption.

According to another aspect of the present invention, there is provided a fault diagnostic apparatus for an evaporated fuel purging system comprising a vapor path connecting a space above a fuel level in a fuel tank of an internal combustion engine to an intake duct of the engine, a purging unit disposed in the vapor path for purging evaporated fuel in the fuel tank into an intake duct through the vapor path, an internal pressure control valve arranged in the vapor path between the purge unit and the fuel tank, which opens when the internal pressure of the fuel tank increases above a predetermined pressure higher than atmospheric pressure to thereby keep the internal pressure of the fuel tank below said predetermined pressure, pressure detecting means for detecting the internal pressure of the fuel tank, failure determining means for performing a determining operation for determining whether the fuel tank has failed according to the internal pressure of the fuel tank detected by the pressure detecting means after the engine is started, temperature detecting means for detecting the temperature of a wall of the fuel tank, and prohibiting means for prohibiting said failure determining means from performing the determining operation when the wall temperature of the fuel tank changes more than a predetermined amount within a given period after the engine starts.

According to this aspect of the present invention, the diagnosis of the fuel tank is not carried out when the change in the wall temperature of the fuel tank within a given period after the engine starts is larger than a predetermined value. When the wall temperature of the fuel tank changes, the internal pressure of the fuel tank also changes. Therefore, by prohibiting the diagnosis of the fuel tank, i.e., by prohibiting the diagnosis when there is the possibility of the error, the accuracy of the diagnosis is improved.

According to another aspect of the present invention, there is provided a fault diagnostic apparatus for an evaporated fuel purging system comprising a vapor path connecting a space above a fuel level in a fuel tank of an internal combustion engine to an intake duct of the engine, a purging unit disposed in the vapor path for purging evaporated fuel in the fuel tank into an intake duct through the vapor path, valve means arranged in the vapor path betweens the purge unit and the fuel tank, which opens when the internal pressure of the fuel tank becomes a predetermined pressure, to thereby keep the internal pressure of the fuel tank within a predetermined pressure, pressure detecting means for measuring the internal pressure of the fuel tank, failure determining means for performing a determining operation for determining whether the fuel tank has failed based on the internal pressure of the fuel tank measured by the pressure detecting means after the engine is started, wherein said failure determining means performs a determining operation in such a manner that an error in the measurement of the internal pressure of the fuel tank due to a measurement tolerance of the pressure detecting means is corrected.

As explained before, the diagnosis of the fuel tank must be carried out using a relatively small change in the internal pressure of the fuel tank. Therefore, the measurement error of the internal pressure due to inherent measurement tolerance of the pressure detecting means affects largely the accuracy of the diagnosis. According to this aspect of the present invention, the failure determining means performs a determining operation for determining whether the fuel tank has failed in such a manner that the measurement error due to the tolerance of the pressure detecting means is corrected thereby improving the accuracy of the diagnosis.

For example, in one aspect of the present invention, the valve means opens when the internal pressure of the fuel tank increases above a predetermined reference pressure higher than atmospheric pressure, to thereby keep the internal pressure of the fuel tank below the reference pressure, and the failure determining means determines whether the fuel tank has failed by comparing the internal pressure of the fuel tank detected at the start of the engine with the internal pressure of the fuel tank detected within a predetermined period after the engine starts.

In this aspect of the present invention, since the internal pressure of the fuel tank at the start of the engine and the internal pressure of the fuel tank within a predetermined period after the engine starts are measured by the same pressure detecting means, both pressure values are considered to include same amount of the error due to the measurement tolerance of the pressure detecting means. Therefore, by comparing these two pressure values, the errors in the detected pressure values cancel each other out and, thereby, an accurate diagnosis can be carried out even if the pressure measured by the pressure detecting means includes an error due to measurement tolerance.

According to another aspect of the present invention, the valve means opens when the difference between the internal pressure of the fuel tank and atmospheric pressure becomes more than a predetermined amount, to thereby keep the pressure difference between the fuel tank and the atmosphere within the predetermined amount, and the pressure detecting means measures a pressure difference between the fuel tank and the atmosphere. Further, the failure determining means comprises first determining means for determining whether the fuel tank has failed by comparing the pressure difference between the fuel tank and the atmosphere when the engine starts with a first reference value, and second determining means for determining whether the fuel tank has failed by comparing the amount of change in the pressure difference between the fuel tank and the atmosphere within a predetermined period after the engine starts with a predetermined second reference value, and the predetermined amount of the pressure difference between the fuel tank and the atmosphere at which the valve means opens is set at a larger value than a total of a measuring tolerance of said pressure detecting means and said first reference value and said second reference value.

Considering the case in which the first determining means determines that the fuel tank is normal if the internal pressure of the fuel tank at the start of the engine is higher, or lower, than the atmospheric pressure by more than the first reference value, and the second determining means determines that the fuel tank is normal if the internal pressure of the fuel tank increases or decreases more than the second reference value. In this case, both the first and second determining means determine that the fuel tank is normal only when the internal pressure of the fuel tank becomes higher than a positive pressure which is higher than the atmospheric pressure by more than a sum of the first reference value and the second reference value, or becomes lower than a negative pressure which is lower than the atmospheric pressure by more than a sum of the first reference value and the second reference value. This means that, in order to prevent a normal fuel tank from being diagnosed as being failed, the valve means must allow the internal pressure of the fuel tank to increase to the above-noted positive pressure, or to decrease to the above-noted negative pressure, i.e., the valve means should not open at a pressure between the above-noted positive pressure and the negative pressure. Further, considering the measurement tolerance of the pressure detecting means, the valve opening pressure must be higher than the above-noted positive pressure by more than the amount of the measurement tolerance, and lower than the above-noted negative pressure by more than the amount of the measurement tolerance. According to this aspect of the invention, since the opening pressure of the valve means is set in such a manner that the internal pressure and the atmospheric pressure become larger than a total of a measuring tolerance of the pressure detecting means and said first reference value and said second reference value, error in the diagnosis in which a normal fuel tank is determined as being failed by the measurement tolerance of the pressure detecting means does not occur.

According to another aspect of the present invention, the valve means opens when the difference between the internal pressure of the fuel tank and atmospheric pressure becomes more than a predetermined amount, to thereby keep the pressure difference between the fuel tank and the atmosphere within the predetermined amount, and said pressure detecting means detects both the internal pressure of the fuel tank and atmospheric pressure. Further, the failure determining means determines whether the fuel tank has failed by comparing the internal pressure of the fuel tank detected by said pressure detecting means at the start of the engine with the atmospheric pressure detected by said pressure detecting means.

Since, in this aspect of the present invention, the atmospheric pressure and the internal pressure of the fuel tank is measured by the same pressure detecting means, and the measured pressure values include the same amount of error caused by the measurement tolerance of the pressure detecting means. Therefore, by carrying out diagnosis by comparing these pressure values, an accurate diagnosis of the fuel tank can be performed regardless of the measurement tolerance of the pressure detecting means.

Further, according to another aspect of the present invention, the purge unit comprises a canister connected to the space above a fuel level in the fuel tank and to the intake duct of the engine by the vapor path for adsorbing the evaporated fuel from the fuel tank and for purging the adsorbed fuel into the intake duct, and a purge control valve for opening and blocking the vapor path between the canister and the intake duct, and the valve means opens when the difference between the internal pressure of the fuel tank and atmospheric pressure becomes more than a predetermined amount, to thereby keep the pressure difference between the fuel tank and the atmosphere within the predetermined amount. The pressure detecting means detects both the internal pressure of the fuel tank and an internal pressure of the canister, and said failure determining means determines whether the fuel tank has failed by comparing the internal pressure of fuel tank detected by said pressure detecting means with the internal pressure of the canister detected by said pressure detecting means at the start of the engine.

The internal pressures of the fuel tank and the canister are detected by the same pressure detecting means, and both internal pressures detected include the same amount of error caused by the measurement tolerance. Therefore, when diagnosing the fuel tank by comparing the internal pressure of the fuel tank with the internal pressure of the canister, the errors in the values of the internal pressures cancel each other. Therefore, an accurate diagnosis of the fuel tank can be performed regardless of the measurement tolerance of the pressure detecting means.

BRIEF DESCRIPTION OF THE DRAWINGS

The present invention will be better understood from the description as set forth hereinafter, with reference to the accompanying drawings, in which.

DESCRIPTION OF PREFERRED EMBODIMENTS

Embodiments of the present invention will be explained with reference to the accompanying drawings.

Figure 1:
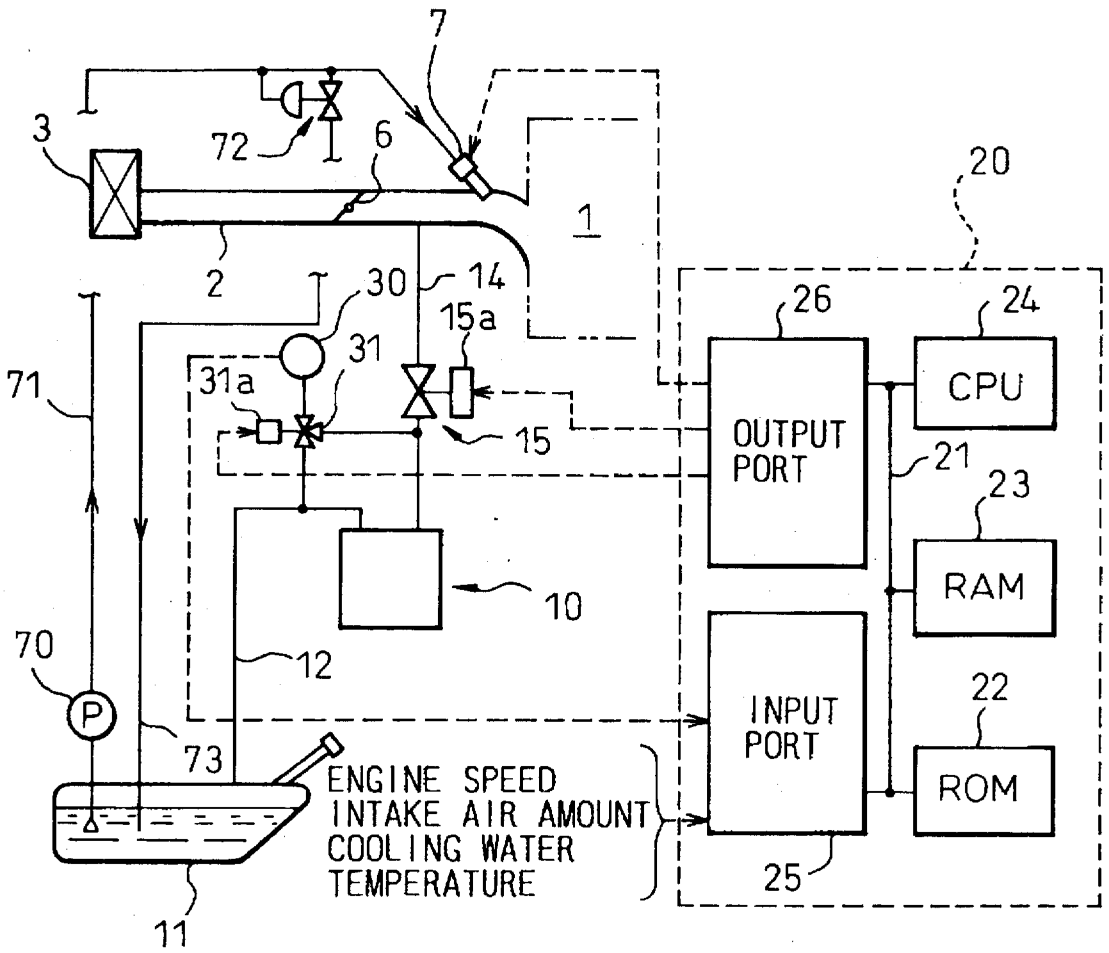
FIG. 1 schematically shows an embodiment of the fault diagnostic apparatus of the present invention when applied to an automobile engine.

FIG. 1 shows an internal combustion engine of an automobile to which the present invention is applied. The engine 1 has an intake duct 2, which has an air cleaner 3 and a throttle valve 6. The throttle valve 6 takes a degree of opening in accordance with the amount of depression of an accelerator pedal (not shown) by the driver of the automobile. Fuel in a fuel tank 11 is pressurized by a fuel pump 70 and is sent to a fuel injector 7 arranged in the intake duct 2.

Fuel in the fuel tank 11 is pressurized by the fuel pump 70 and is sent to the fuel injector 7 through a feed pipe 71. A pressure regulator 72 controls the pressure of fuel supplied to the fuel injector 7. The part of the fuel that is supplied to the fuel injector 7 and is not injected into the engine is returned to the fuel tank 11 through a return pipe 73.

A control circuit 20 may, for example, consist of a microcomputer of conventional type which comprises a ROM (read-only memory) 22, a RAM (random access memory) 23, a CPU (microprocessor) 24, an input port 25, and an output port 26 connected to one another through a bi-directional bus 21. The control circuit 20 performs basic engine control such as fuel injection control and ignition timing control of the engine 1. Further, in this embodiment, the control circuit 20 performs a fault diagnosis of an evaporated fuel purging system as explained later.

The output port 26 of the control circuit 20 is connected to the fuel injector 7 through a drive circuit (not shown) to control an opening period, i.e., the amount of fuel injection of the fuel injector 7. The output port 26 is also connected to an actuator 15a of a purge control valve 15 to control the opening of the purge control valve 15.

The input port 25 receives signals representing an engine speed, the amount of intake air, the temperature of engine cooling water, etc., from sensors (not shown), as well as a signal from a pressure sensor 30, through A/D converters (not shown).

A canister 10 adsorbs evaporated fuel sent from the fuel tank 11. The canister 10 is connected to a space above a fuel level in the fuel tank 11 through a vapor path 12 and to a part of the intake duct 2 downstream of the throttle valve 6 through a purge path 14. The purge control valve 15 opens and closes the purge path 14. The purge control valve 15 is opened under given operating conditions of the engine 1 in response to a signal from the control circuit 20, to thereby connect the canister 10 to the portion of the intake duct 2 downstream of the throttle valve 6, to thereby purge evaporated fuel from the canister 10 into the intake duct 2. Numeral 15a in FIG. 1 denotes an actuator for driving the purge control valve 15 which may be a solenoid actuator or a diaphragm type negative pressure actuator.

The pressure sensor 30 is used to detect a failure of the fuel tank 11. The pressure sensor 30 produces a voltage signal proportional to the difference between a detected pressure and atmospheric pressure. The output of the sensor 30 is supplied to the input port 25 of the control circuit 20 through the AD converter (not shown).

The pressure sensor 30 is connected to the vapor passage 12 as well as the purge path 14 between the canister 10 and the purge control valve 15 through a three-way valve 31. By switching the three-way valve 31, the sensor 30 detects the pressure of the vapor path 12, i.e., the internal pressure of the fuel tank 11, or the pressure of the purge path 14, i.e., the internal pressure of the canister 10. The three-way valve 31 has an actuator 31a, which may be a similar type as the actuator 15a. The actuator 31a is connected to a drive circuit (not shown), which is connected to the output port 26 of the control circuit 20. In response to a signal from the control circuit 20, the actuator 31a switches the three-way valve 31 to connect the pressure sensor 30 selectively to either the vapor path 12 or purge path 14.

Figure 2:
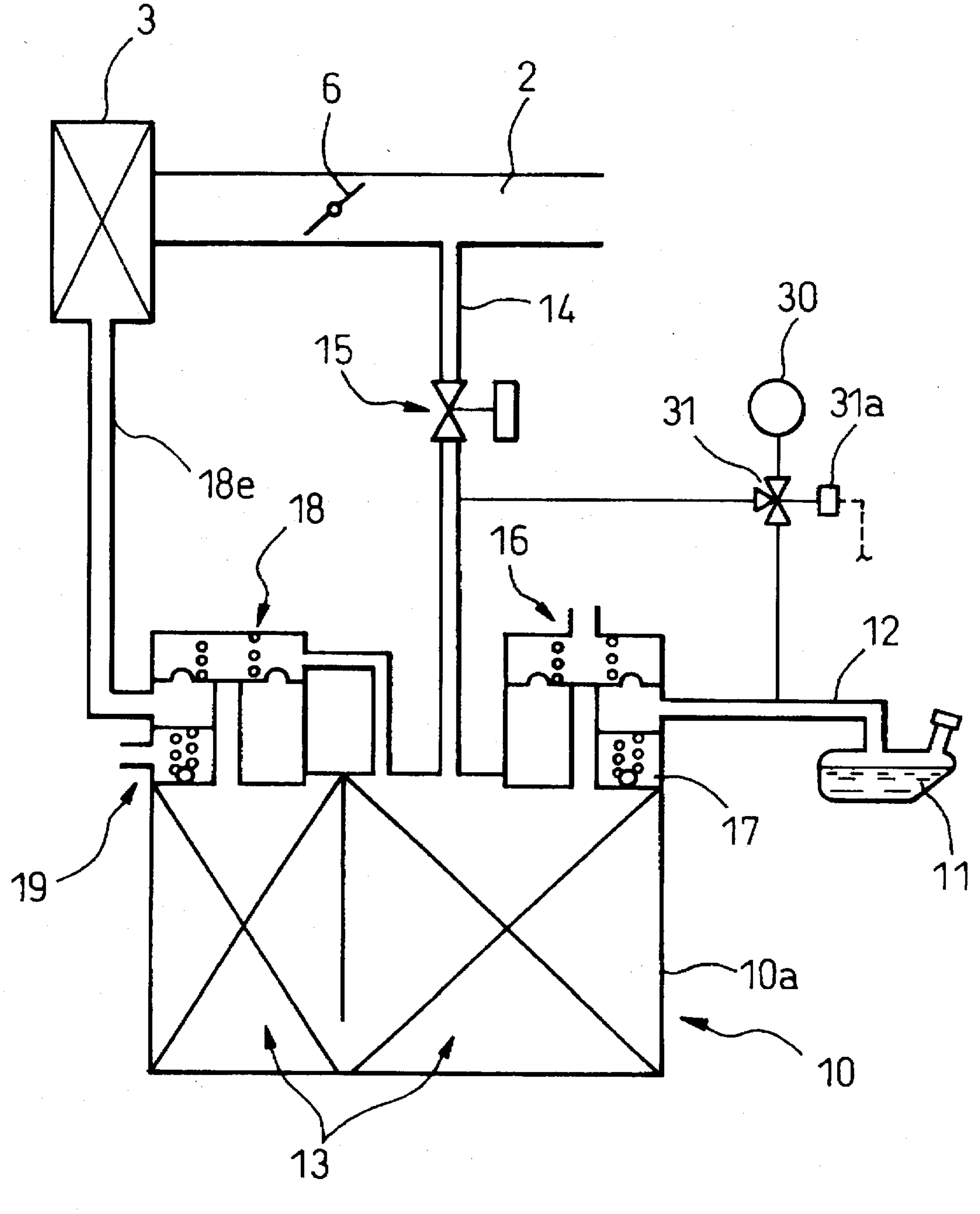
FIG. 2 schematically shows the construction of a canister.

FIG. 2 shows the structure of the canister 10. The canister 10 has a housing 10a filled with an adsorbent 13, such as activated carbon, for adsorbing evaporated fuel.

The housing 10a has an internal pressure control valve 16 and a pressure equalizing valve 17 that are connected to the vapor path 12. The housing 10a also has an atmospheric valve 18 and an atmospheric release valve 19.

The internal pressure control valve 16 opens when the internal pressure of the fuel tank 11 becomes higher than atmospheric pressure by $\Delta P_A$ to connect the canister 10 to the fuel tank 11. The pressure equalizing valve 17 opens when the internal pressure of the fuel tank 11 becomes lower than the internal pressure of the canister 10 by $\Delta P_B$, to thereby connect the canister 10 to the fuel tank 11.

The atmospheric valve 18 opens when the internal pressure of the canister 10 to becomes lower than atmospheric pressure by $\Delta P_C$ to connect the canister 10 to the atmosphere through a pipe 18e and the air cleaner 3. When the internal pressure of the canister 10 is higher than atmospheric pressure by a set value, the valve 19 connects the canister 10 to the atmosphere, thereby preventing an excessive increase in the pressure of the canister 10. The valve opening pressures $\Delta P_A$ to $\Delta P_C$ of the valves 16 through 19 will be explained later.

The function of the canister 10 will be explained.

The canister 10 is connected to the intake duct 2 through the purge path 14 in which the purge control valve 15 is disposed. When the internal pressure of the fuel tank 11 increases to the valve opening pressure $\Delta P_A$ of the internal pressure control valve 16 when the purge control valve 15 is closed, the internal pressure control valve 16 opens. When the internal pressure control valve 16 opens, evaporated fuel flows from the fuel tank 11 into the canister 10 through the vapor path 12. The evaporated fuel is adsorbed by the adsorbent 13, and remaining air is released through the valve 19. As a result, the internal pressure of the fuel tank 11 is maintained lower than the valve opening pressure (atmospheric pressure+$\Delta P_A$) of the internal pressure control valve 16, and the evaporated fuel is not emitted into the atmosphere.

If the purge control valve 15 is opened during the operation of the engine, a negative pressure in the intake duct 2 downstream of the throttle valve 6 is introduced into the canister 10 through the purge path 14.

This negative pressure opens the atmospheric valve 18, and clean air flows into the canister 10 through the pipe 18e. The air flowing through the canister 10 releases fuel from the adsorbent 13, and a mixed gas of air and released fuel is purged into the intake duct 2 through the purge path 14 and is burned in the engine. This prevents the adsorbent 13 from being saturated with the evaporated fuel.

After the engine is stopped, the temperature of fuel in the fuel tank 11 drops, and the internal pressure of the fuel tank 11 may become lower than the pressure of the canister 10 by $\Delta P_B$. Then, the pressure equalizing valve 17 opens to connect the fuel tank 11 to the canister 10 through the vapor path 12, so that the difference between the internal pressures of the fuel tank 11 and canister 10 is maintained smaller than the valve opening pressure difference of the pressure equalizing valve 17. Due to the atmospheric valve 18, the difference between the internal pressure of the canister 10 and the atmospheric pressure is kept less than $\Delta P_C$. As a result, the internal pressure of the fuel tank 11 is maintained above a value of {atmospheric pressure$-(\Delta P_B+\Delta P_C)$} due to the functions of the valves 17 and 18.

In this way, the valves 16, 17, and 18 maintain the internal pressure of the fuel tank 11 between a positive pressure of {atmospheric pressure$+\Delta P_A$} and a negative pressure of {atmospheric pressure$-(\Delta P_B+\Delta P_C)$}.

Next, the diagnosis of the fuel tank according to embodiments will be explained.

A failure such as a leak of the fuel tank 11 is detected according to a change in the internal pressure of the fuel tank 11 after the engine is started.

The internal pressure of the fuel tank 11 after the start of the engine varies depending on the temperature of fuel in the fuel tank 11. When the engine is cold started, the temperature of fuel in the fuel tank 11 is low. In this case, the internal pressure of the fuel tank 11 is negative because the pressure of evaporated fuel in the fuel tank 11 is low. On the other hand, when the engine is hot started, the temperature of fuel in the fuel tank 11 is high. In this case, the internal pressure of the fuel tank 11 is positive because the pressure of evaporated fuel in the fuel tank 11 is high. As explained before, the internal pressure of the fuel tank 11 is controlled by the valves 16, 18, etc., between {atmospheric pressure$+\Delta P_A$} and {atmospheric pressure$-(\Delta P_B+\Delta P_C)$}.

After the start of the engine, the fuel pump 70 lowers the level of fuel in the fuel tank 11, and therefore, the internal pressure of the fuel tank 11 decreases below the pressure at the start of the engine.

After the start of the engine, surplus fuel of high temperature returns from the fuel injector 7 to the fuel tank 11 through the return pipe 73 and, thereby the temperature of fuel in the fuel tank 11 as well as the internal pressure of the fuel tank 11 gradually increase.

Figure 3:
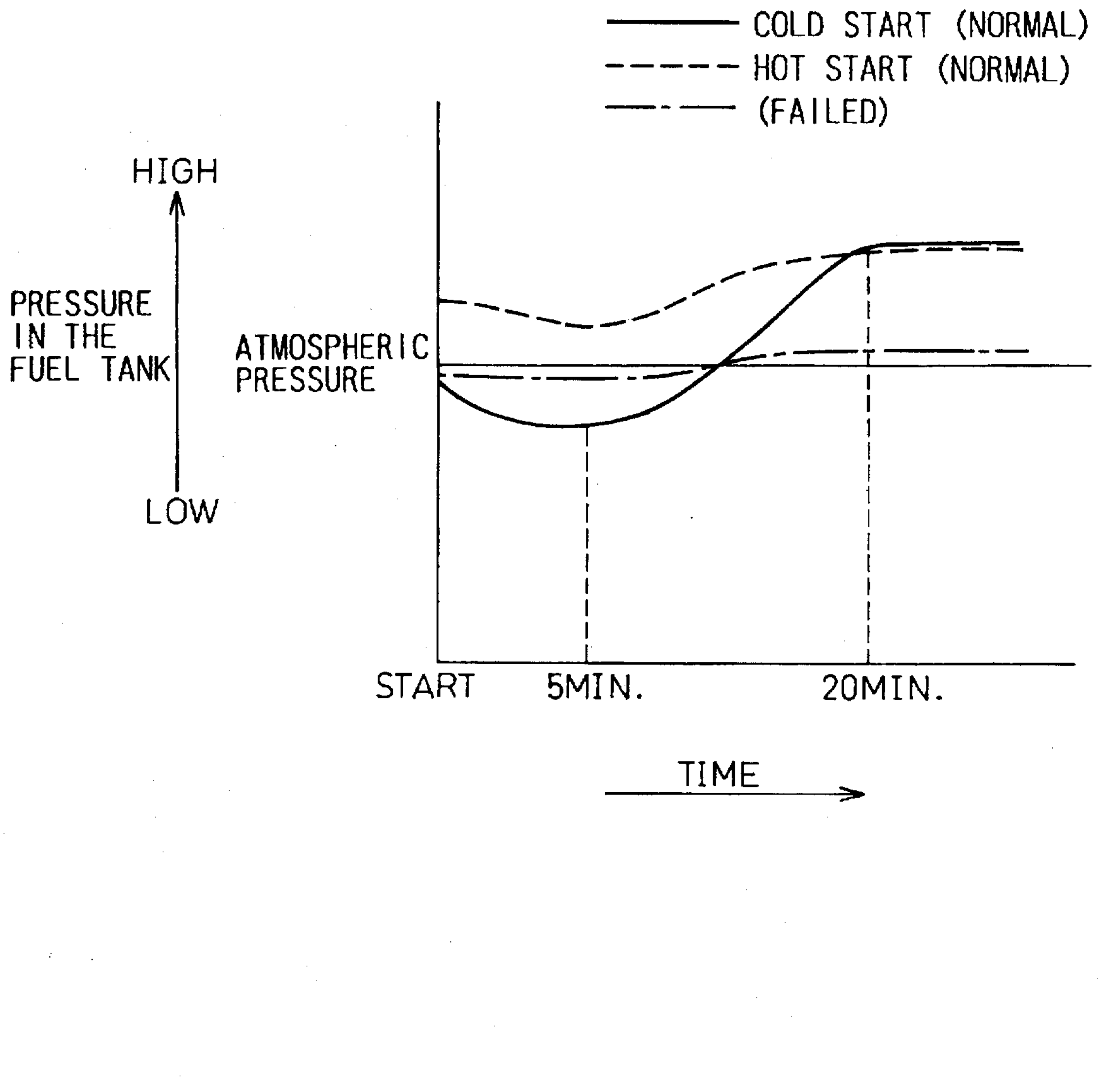
FIG. 3 schematically shows temporal changes in the internal pressure of a fuel tank after the engine is started.

FIG. 3 shows changes in the internal pressure of the fuel tank 11 after the engine is started at low temperature and at high temperature. A solid line indicates a change in the internal pressure of the fuel tank 11 after the engine is started at low temperature with the fuel tank 11 having no leak. A broken line indicates a change in the internal pressure of the fuel tank 11 after the engine is started at high temperature with the fuel tank 11 having no leak. A dot-and-dash line indicates a change in the internal pressure of the fuel tank 11 after the engine is started with the fuel tank 11 having a leak. When the engine is started at low temperature, the internal pressure of the fuel tank 11 temporarily decreases to a negative value as the level of fuel in the tank 11 drops and reaches the minimum pressure at about five minutes after the start of the engine. Thereafter, the pressure of the fuel tank 11 gradually increases and approaches the valve opening pressure of the internal pressure control valve 16 at about 20 minutes after the start of the engine.

When the engine is restarted after a short interval, temperature of fuel in the fuel tank 11 is high, and the internal pressure of the fuel tank 11 is higher than atmospheric pressure and reaches the valve opening pressure of the internal pressure control valve 16 a short time after the engine starts.

If the tank 11 has a leak, the tank 11 directly communicates with the atmosphere, and therefore, the internal pressure of the fuel tank 11 is maintained around atmospheric pressure irrespective of the temperature of fuel in the fuel tank 11 as indicated with the dot-and-dash line.

It is possible, therefore, to determine whether the fuel tank 11 has a leak according to a change in the pressure of the fuel tank 11 within a given period after the start of the engine.

To diagnose the fuel tank 11 according to a change in the internal pressure of the fuel tank 11 after the start of the engine, there are various methods that employ parameters calculated according to the output of the pressure sensor 30. Among them, three methods will be explained hereinafter.

(1) A diagnostic method employing the internal pressure of the fuel tank 11 detected by the pressure sensor 30 as a parameter for detecting the failure of the fuel tank.

Figure 4:
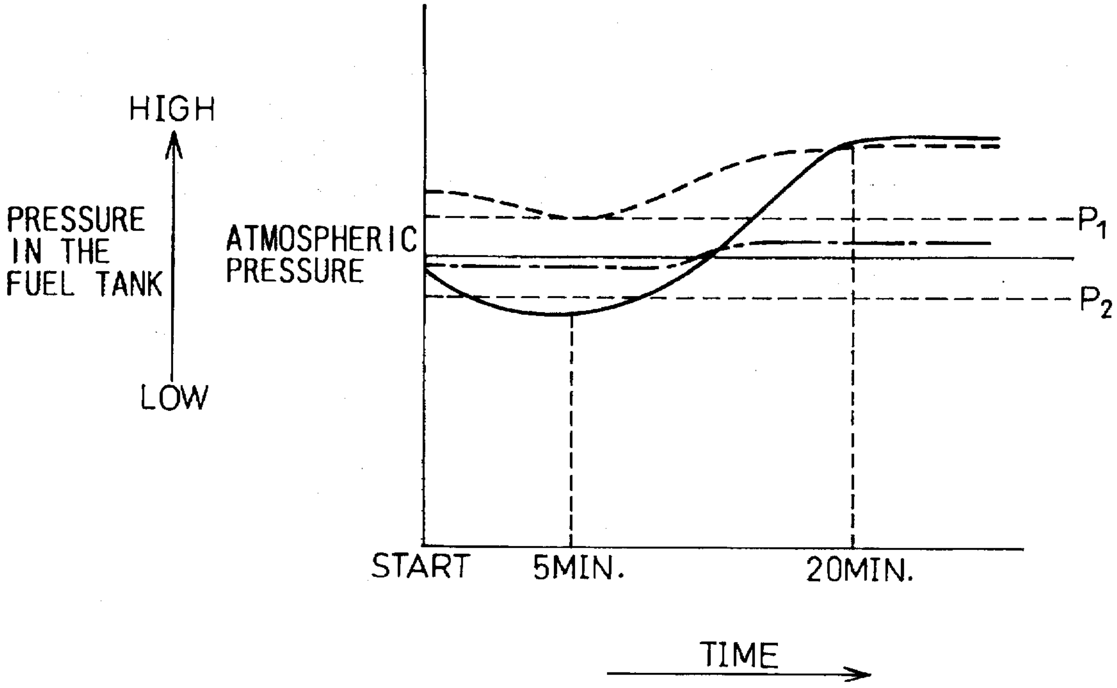
FIG. 4 explains a method of the fault diagnosis of an evaporated fuel purging system according to an embodiment of the present invention.

FIG. 4 shows the principle of this method. This drawing is similar to FIG. 3 and shows changes in the internal pressure of the fuel tank 11 after the start of the engine. As explained above, the internal pressure of the fuel tank 11 drops to the minimum about five minutes after the start of the engine and then increases to approach the valve opening pressure of the internal pressure control valve 16 about 20 minutes after the start of the engine. If the internal pressure of the fuel tank 11 never drops to a predetermined negative pressure ($P_2$ in FIG. 4), or never increases above a predetermined positive pressure ($P_1$ in FIG. 4) within a given period (for example, about 20 minutes) after the start of the engine, it is determined that the fuel tank 11 has a leak as indicated with a dot-and-dash line in FIG. 4.

The values $P_1$ and $P_2$ are set according to the size of a leak to be detected. In this embodiment, $P_1$ is set at a positive value of atmospheric pressure plus about 0.3 KPa (30 $mmH_2O$), and $P_2$ is set at a negative value of atmospheric pressure minus about 0.3 KPa (30 $mmH_2O$).

The control circuit 20 switches the three-way valve 31 to connect the pressure sensor 30 to the vapor path 12 at the start of the engine, to monitor the internal pressure of the fuel tank 11 and determines whether the fuel tank 11 has a leak.

Figure 5:
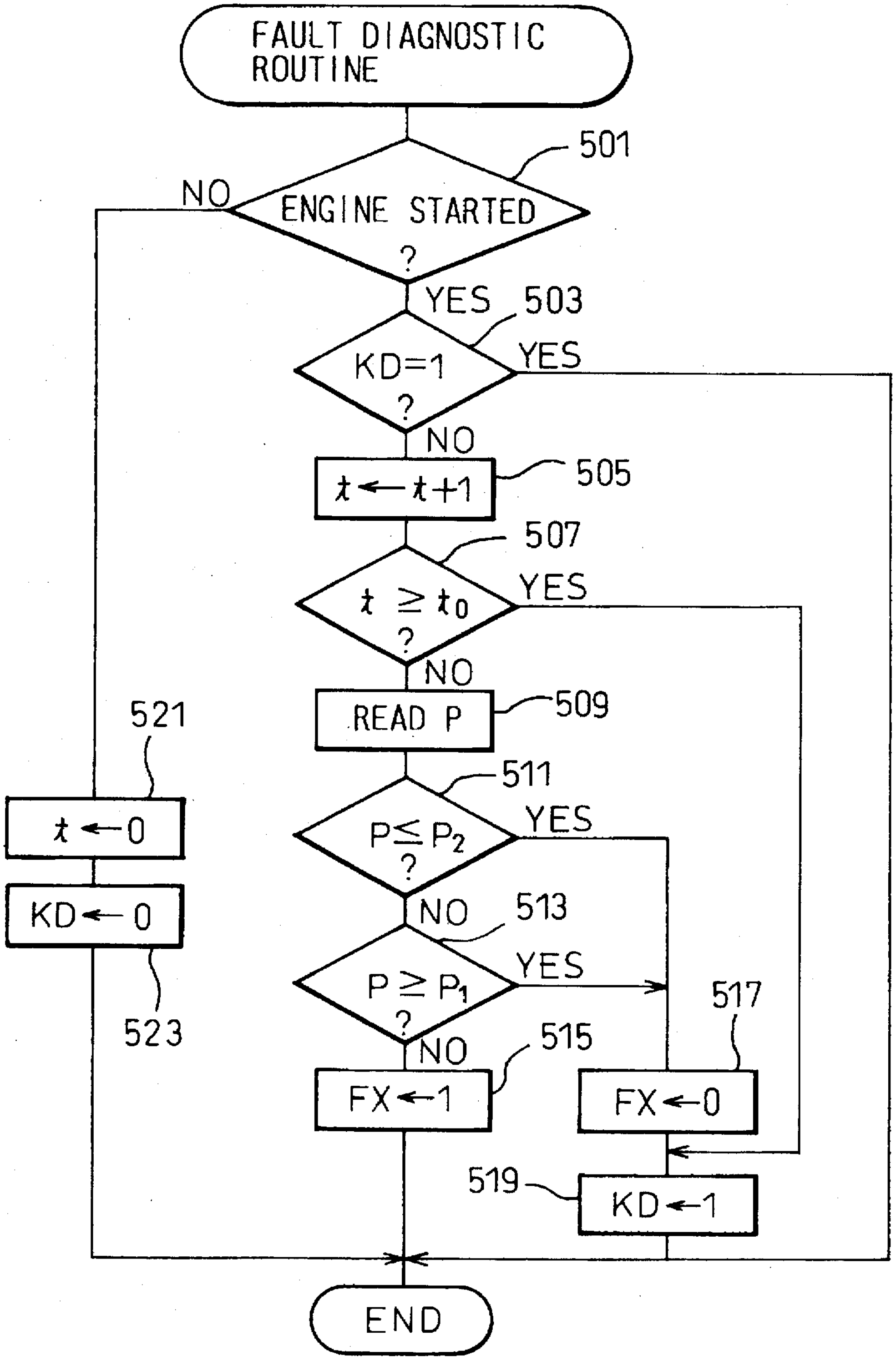
FIG. 5 is a flowchart showing a fault diagnostic routine according to an embodiment of the present invention.

FIG. 5 is a flowchart showing the diagnostic routine carried out by the control circuit 20 at regular intervals.

A counter t shown in steps 505, 507, and 521 is incremented by one at step 505 whenever the routine is carried out after the start of the engine. The counter t indicates a time after the start of the engine. A value $t_0$ at step 507 corresponds to a period of about 20 minutes after the start of the engine. A flag KD shown in steps 503, 519, and 523 indicates whether the diagnosis of the fuel tank 11 is completed. KD=1 means that the diagnosis is complete, and in this case the routine terminates without performing further diagnosis (step 503). A flag FX indicates the result of the diagnosis of the fuel tank 11, and FX=1 means that the tank has failed, and FX=0 means that the tank is normal.

After the engine is started, step 509 reads the output of the pressure sensor 30 indicating the internal pressure P of the fuel tank 11 whenever the routine is carried out. Step 501 determines whether the engine has started according to an engine speed. In this embodiment, when the engine speed is above a given value (for example, 400 rpm), it is determined that the engine has started. Step 511 checks if the internal pressure P of the fuel tank 11 is below a reference value $P_2$, and step 513 checks if the pressure P is above a reference value $P_1$. If $P \leqq P_2$ in step 511 or if $P \geqq P_1$ in step 513 before 20 minutes has elapsed at step 507 after the start of the engine, it is determined that the fuel tank 11 is normal. Then, step 517 sets the flag FX to 0, and step 519 sets the flag KD to 1. If $P_2 < P < P_1$ at steps 511 and 513, step 515 sets the flag FX to 1 (failure). If 20 minutes has elapsed at step 507 after the start of the engine, the routine terminates after setting the flag FX to 1 at step 519.

In this way, this routine determines that the fuel tank 11 has a leak if the internal pressure of the fuel tank 11 never drops below the reference value $P_2$ or never exceeds the reference value $P_1$ within a given period after the start of the engine.

(2) A diagnostic method employing a change in the internal pressure of the fuel tank within a given period after the start of the engine as a parameter for determining the failure of the fuel tank.

Figure 6:
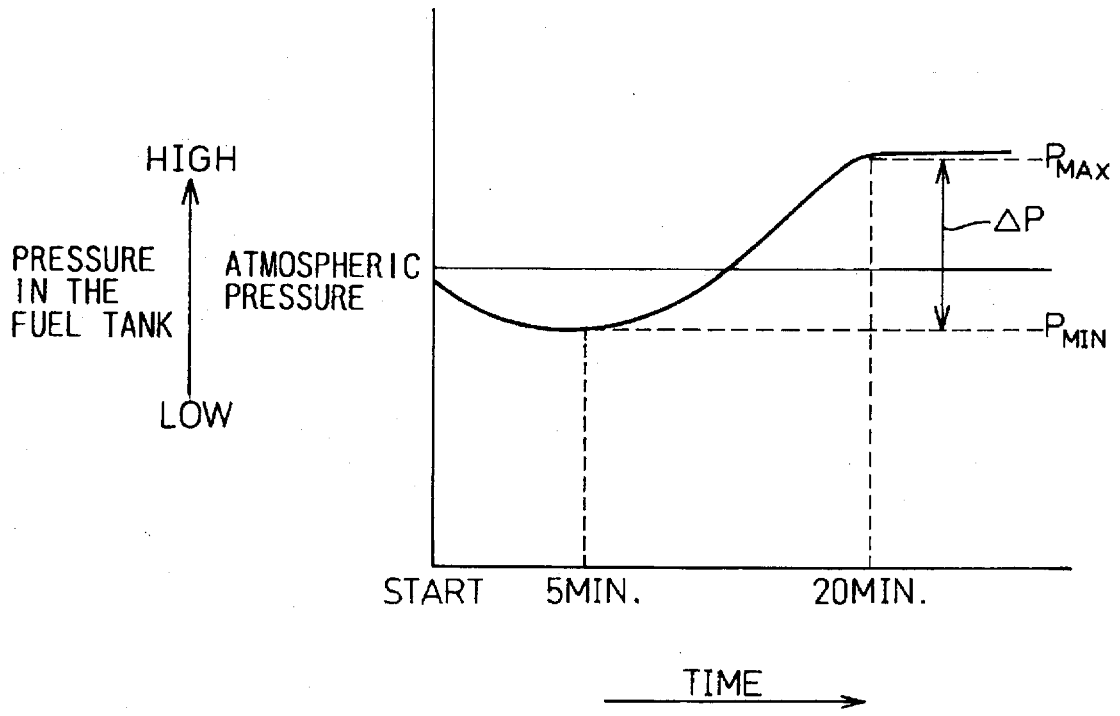
FIG. 6 explains another method of the fault diagnosis of the evaporated fuel purging system.

FIG. 6 is a similar drawing to FIG. 4 which explains the principle of the method. Instead of determining whether the fuel tank 11 has failed in accordance with the detected pressure in the fuel tank 11, in this method, it is determined that the fuel tank 11 has a leak if the difference $\Delta P$ between a lowest pressure $P_{MIN}$ and a highest pressure $P_{MAX}$ of the fuel tank 11 obtained within a given period after the start of the engine is smaller than a reference value $\Delta P_0$ (for example, about 0.6 KPa).

Figure 7:
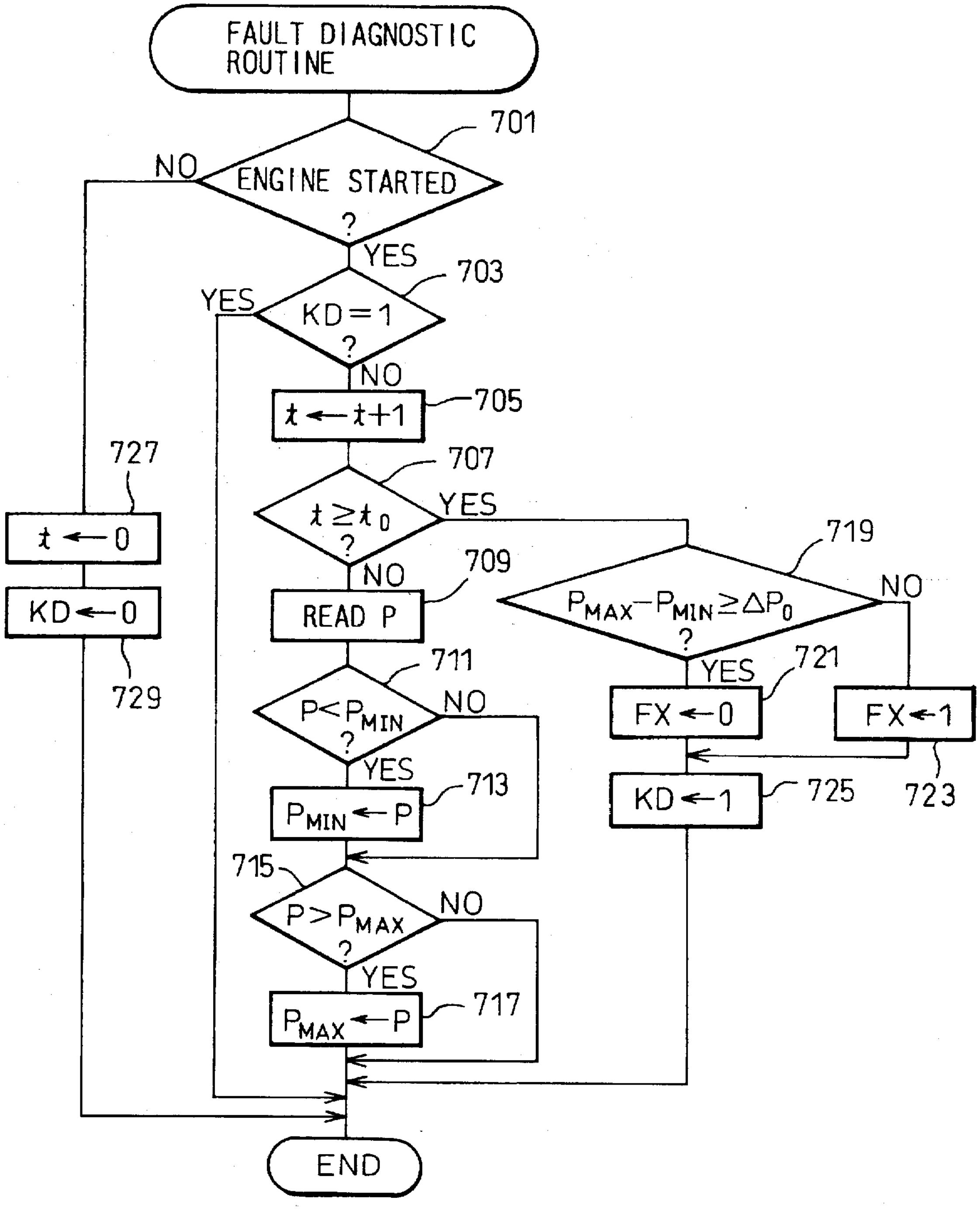
FIG. 7 is a flowchart showing a fault diagnostic routine according to an embodiment of the present invention.

FIG. 7 is a flowchart showing a routine of the above diagnostic method carried out by the control circuit 20. Flags KD and FX, counter t, value $t_0$, etc., of FIG. 7 are the same as those of FIG. 5, and therefore, they are not explained again.

In the routine in FIG. 7, until the predetermined time $t_0$ has elapsed after the engine is started at step 707, the minimum $P_{MIN}$ and maximum $P_{MAX}$ of the internal pressure of the fuel tank 11 are renewed at steps 713 and 717 according to the output of the pressure sensor 30. When the time $t_o$ elapses, the difference between $P_{MAX}$ and $P_{MIN}$ is compared with the reference value $\Delta P_0$. If the difference is greater than $\Delta P_0$, it is determined that the fuel tank 11 is normal at step 721. If the difference is smaller than $\Delta P_0$, it is determined that the fuel tank 11 has failed at step 723.

(3) A diagnostic method employing a temporal integration of the internal pressure of the fuel tank 11 after the start of the engine as a parameter for determining the failure of the fuel tank.

Figure 8:
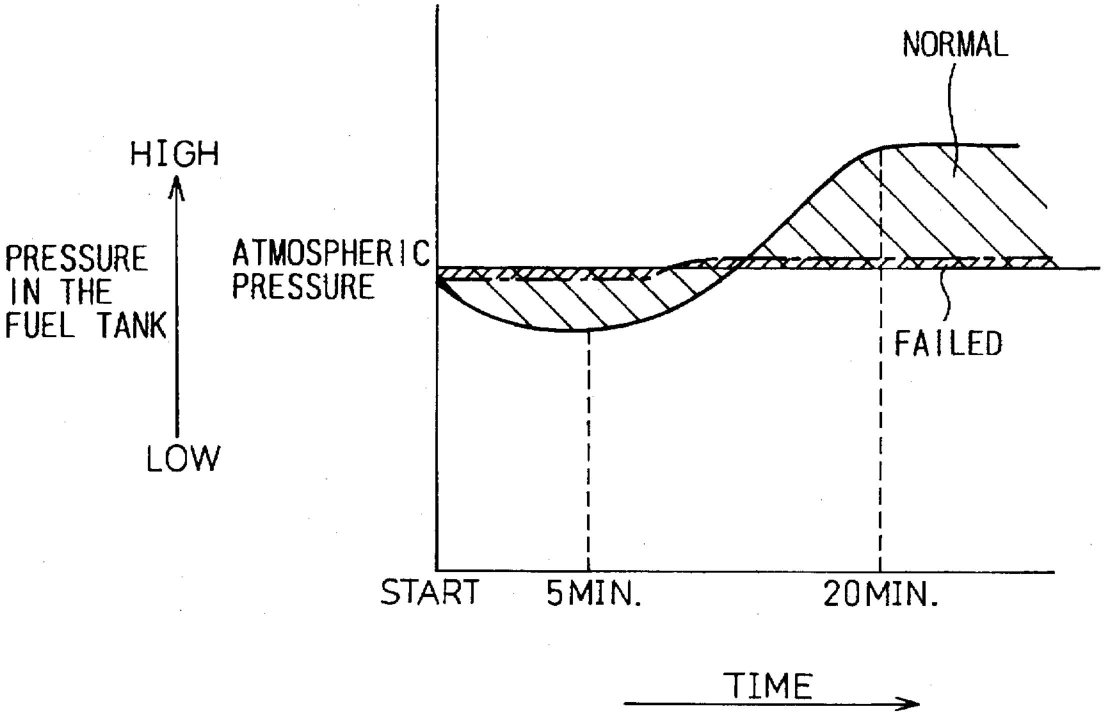
FIG. 8 explains another method of the fault diagnosis of the evaporated fuel purging system according to an embodiment of the present invention.

FIG. 8 is a similar drawing to FIG. 4 and explains the principle of the method. This method integrates the internal pressure of the fuel tank 11. The method of FIG. 4 diagnoses the fuel tank 11 according to the detected internal pressure of the fuel tank 11 after the start of the engine, and therefore, each of the reference values $P_1$ and $P_2$ must be set at small values (for example, about 0.3 KPa) in order to detect a small leak. The method of FIG. 6 diagnoses the fuel tank 11 according to a change in the internal pressure of the fuel tank 11 after the start of the engine, and therefore, the reference value $\Delta P_0$ must be also set at a small value in order to detect a small leak. The internal pressure of the fuel tank 11 may approach the reference values depending on ambient temperature or atmospheric pressure even if the fuel tank 11 has a leak. Accordingly, the methods of FIGS. 4 and 6 may cause an incorrect diagnosis due to disturbance such as a change in the temperature and atmospheric pressure. To solve this problem, the method of FIG. 8 diagnoses the fuel tank 11 according to a value obtained by integrating the internal pressure of the fuel tank 11, i.e., the area of the hatched portion in FIG. 8 surrounded by a curve of the internal pressure of the fuel tank 11 and a curve of atmospheric pressure. Even if the fuel tank 11 has failed, the internal pressure of the fuel tank 11 after the start of the engine changes toward the negative and positive sides. In this case, an integration of the internal pressure of the fuel tank 11 is very small compared with that in a normal fuel tank as shown in FIG. 8. Accordingly, this method is capable of correctly diagnosing the fuel tank 11 without being affected by a disturbance.

Figure 9:
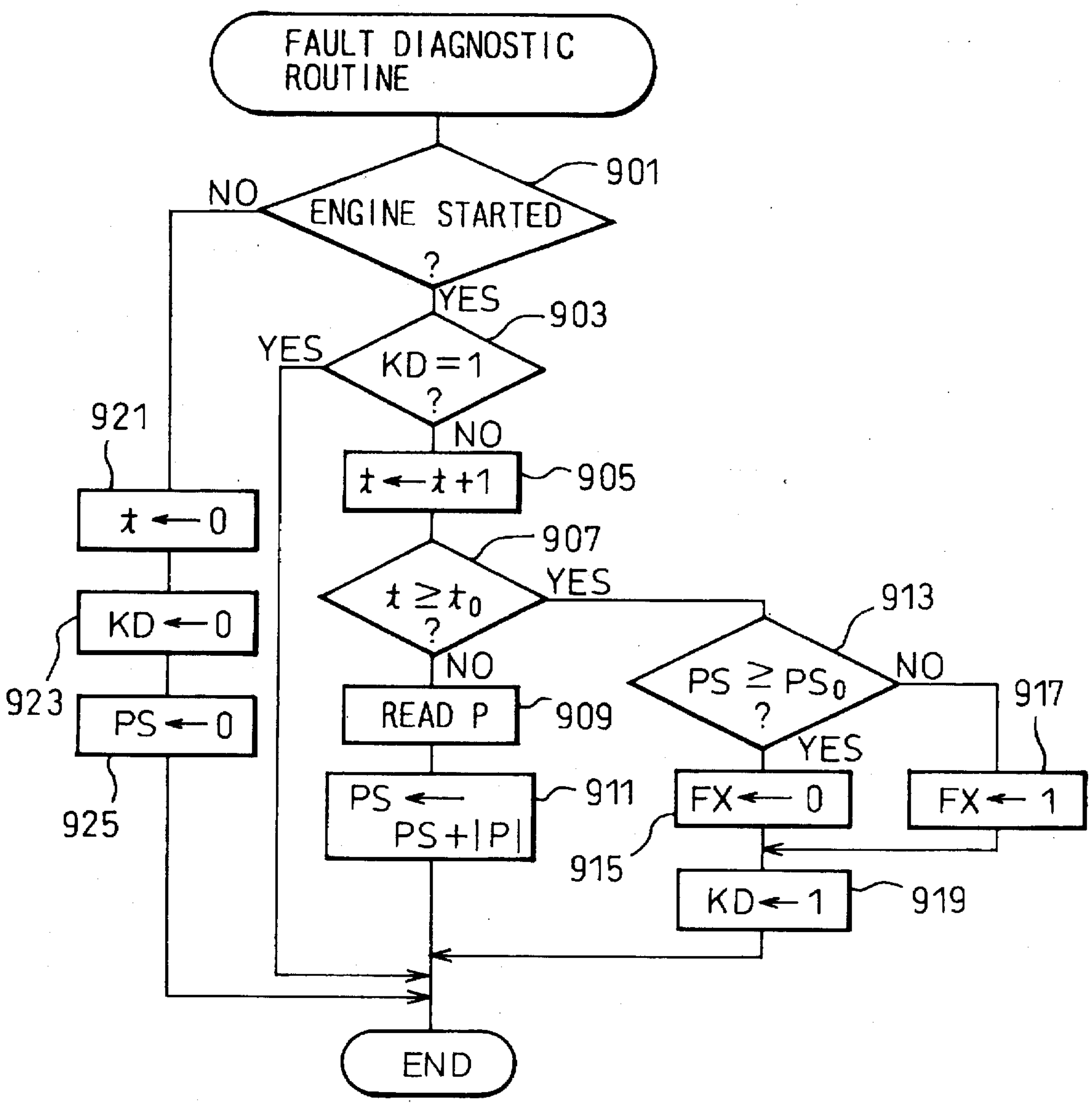
FIG. 9 is a flowchart showing a fault diagnostic routine according to an embodiment of the present invention.

FIG. 9 is a flowchart showing a routine of the integration method of the internal pressure of the fuel tank 11. The routine is carried out by the control circuit 20 at regular intervals.

Flags KD and FX, counter t, and value $t_0$ of FIG. 9 are the same as those of FIGS. 5 and 7.

In the routine in FIG. 9, until the time $t_0$ has elapsed after the engine starts at step 907, step 911 calculates an integration PS of the internal pressure of the fuel tank 11 (more precisely, an integration of the absolute value of the difference between atmospheric pressure and the internal pressure of the fuel tank 11) according to the output P of the pressure sensor 30 whenever the routine is carried out. When the time $t_0$ has elapsed, step 913 compares the integrated value PS with a reference value $PS_0$. If $PS \geqq PS_0$, step 915 determines that the fuel tank 11 is normal, and if $PS < PS_0$, step 917 determines that the fuel tank 11 has failed.

Similarly to FIGS. 5 and 7, the time $t_0$ is set at about 20 minutes. The time $t_0$ may be a value at which the pressure of the fuel tank 11 having no leak reaches a negative peak value. For example, the time $t_0$ may be about five minutes after the start of the engine. When the fuel tank 11 has a leak, the negative peak value of the internal pressure of the fuel tank becomes small and also the period in which the pressure becomes negative value becomes relatively short as shown in FIG. 8. Therefore, when the fuel tank 11 has a leak, an integrated value of the internal pressure of the fuel tank 11 in the negative period greatly differs from that of the fuel tank having no leak.

After the failure flag FX is set to 1 in the routine of any one of FIGS. 5, 7, and 9, the control circuit 20 executes a routine (not shown) to turn ON an alarm to notify the driver of the failure of the evaporated fuel purging system. The value of the flag FX may be stored in a backup RAM that keeps the data after the main switch of the engine is turned OFF, so that the data can be used for repair and maintenance.

To diagnose the fuel tank 11 according to the methods (1) to (3), the internal pressure of the fuel tank 11 having no leak must follow the curves shown in FIG. 3. However, depending on the operating conditions of the engine, a change in the pressure of the fuel tank 11 may be small even if the fuel tank 11 is normal.

The internal pressure of the fuel tank 11 decreases after the start of the engine as shown in FIG. 3 because the level of fuel in the fuel tank 11 drops due to the fuel consumption of the engine. If the engine idles just after the start of the engine, the fuel consumption is very small, and the level of fuel in the fuel tank 11 drops very slowly. As a result, a drop in the internal pressure of the fuel tank 11 is small.

After the engine is started, the temperature of fuel in the fuel tank 11 increases, and the internal pressure thereof also increases. However, if the engine is operated under heavy load, the level of fuel in the fuel tank 11 drops rapidly because the engine consumes much fuel. As a result, an increase in the temperature of fuel in the fuel tank 11 may not increase the internal pressure of the fuel tank 11. If any one of the methods (1) to (3) is used under this state to diagnose the fuel tank 11, the fuel tank 11 may be diagnosed as being failed even if it is normal.

To avoid this problem, the embodiment explained hereinafter detects a fuel consumption $FE_1$ in a period of, for example, five minutes after the start of the engine in which the internal pressure of the fuel tank 11 usually drops, as well as a fuel consumption $FE_2$ in a period between, for example, 5 and 20 minutes after the start of the engine during which the internal pressure of the fuel tank 11 usually increases. If the fuel consumption $FE_1$ is below a reference value, or if the fuel consumption $FE_2$ is above a reference value, a fault diagnosis according to any one of the methods (1) to (3) is disabled.

Figure 10:
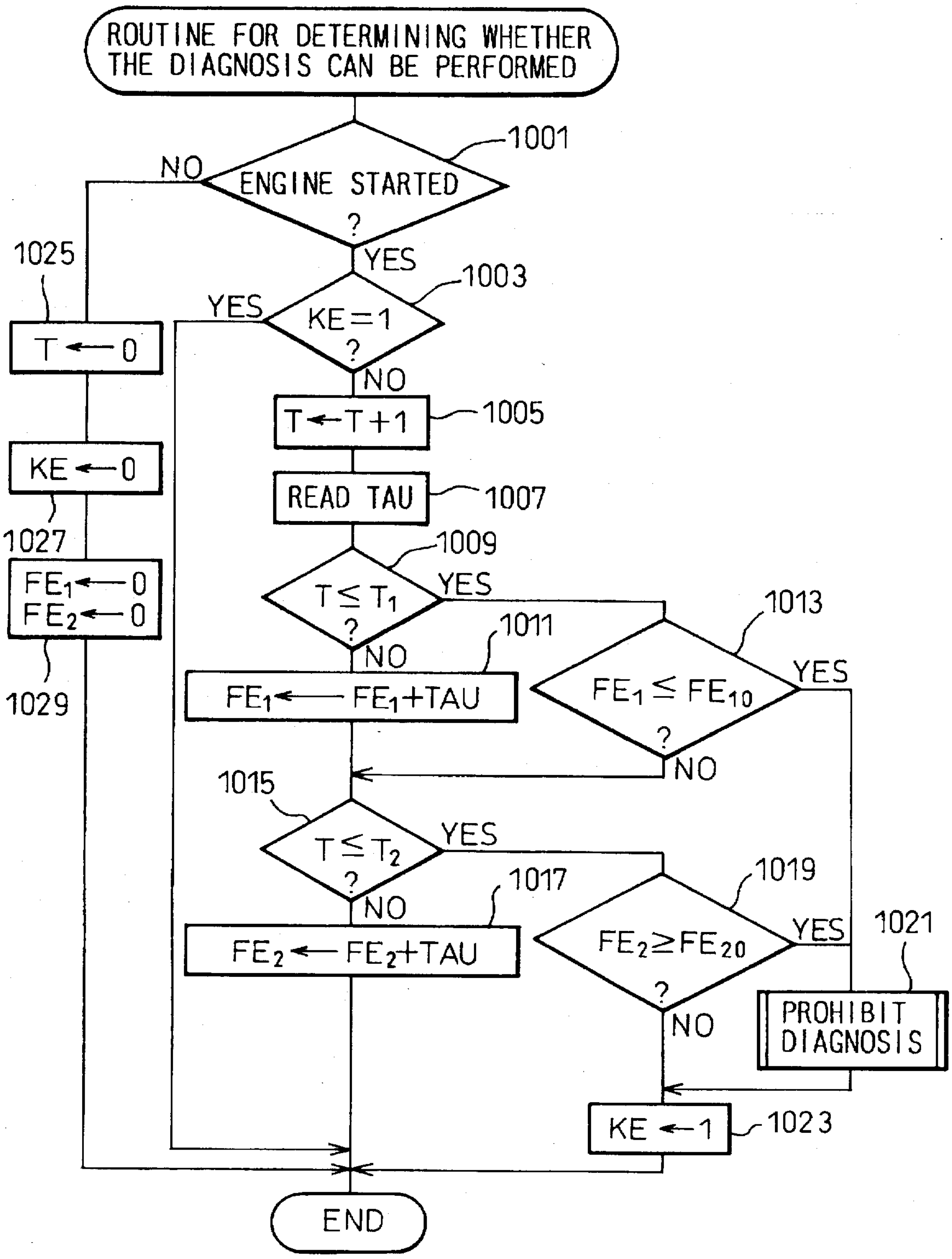
FIG. 10 is a flowchart showing a routine for determining whether a fault diagnosis can be carried out according to an embodiment of the present invention.

FIG. 10 is a flowchart showing a routine to determine whether a fault diagnosis can be carried out according to the fuel consumption of the engine. The routine is carried out by the control circuit 20 at regular intervals.

Step 1001 determines whether the engine has started. If the engine start is incomplete, i.e., if it is cranking, steps 1025 to 1029 initializes a counter T, a flag KE, and cumulative fuel consumption values $FE_1$ and $FE_2$.

If the engine start is complete in step 1001, step 1003 determines whether the diagnostic flag KE is 1. If KE=1, the routine is terminated immediately. The flag KE is initialized to 0 in step 1027 at the start of the engine and is set to 1 in step 1023 after the determination of whether the diagnosis must be carried out. Once the flag KE is set to 1, the steps 1005 and following thereto are not carried out.

Step 1005 increments the counter T by one. The counter T is cleared in step 1025 at the start of the engine. After the engine is started, the counter T is incremented by one whenever the routine is carried out. Since the routine is carried out at regular intervals, the counter T indicates a time elapsed after the start of the engine.

Step 1007 reads a fuel injection amount TAU of the fuel injector 7 (FIG. 1). The fuel injection amount is calculated at regular intervals by a routine (not shown) executed by the control circuit 20. A predetermined area of the RAM 23 stores the latest fuel injection amount. The fuel injection amount TAU denotes the amount of fuel injected from the fuel injector 7 per unit time.

Steps 1009 and 1011 accumulate the fuel injection amount TAU until the value of the counter T reaches a predetermined value $T_1$, to thereby provide the cumulative fuel consumption $FE_1$. The value $T_1$ corresponds to a period of about five minutes after the start of the engine in which the internal pressure of the fuel tank 11 decreases. Namely, the value $FE_1$ represents the cumulative amount of fuel consumed by the engine for five minutes after the start of the engine.

When the counter T counts the value $T_1$ in step 1009, step 1013 determines whether the fuel consumption $FE_1$ is smaller than a reference value $FE_{10}$. If $FE_1 \leqq FE_{10}$, fuel consumption is too small to decrease the internal pressure of the fuel tank 11, and therefore, an incorrect diagnosis will be made. Accordingly, step 1021 disables the fault diagnostic routine of any one of FIGS. 5, 7, and 9. In this case, the routine terminates this time after setting the flag KE to 1 to indicate that the determination of whether the fault diagnosis can be carried out is complete at step 1023.

If $FE_1 > FE_{10}$ in step 1013, the fuel consumption $FE_1$ is in a proper range, and steps 1015 and 1017 calculate the cumulative fuel consumption $FE_2$ in a period between $T_1$ and $T_2$ counted by the counter T. The value $T_2$ corresponds to a period of about 20 minutes after the start of the engine in which the internal pressure of the fuel tank 11 increases close to the valve opening pressure of the internal pressure control valve 16.

After the counter T counts the value $T_2$, step 1019 determines whether the fuel consumption $FE_2$ is above a reference value $FE_{20}$. If $FE_2 \geqq FE_{20}$, fuel consumption is too large to increase the internal pressure of the fuel tank 11. Namely, an increase in the internal pressure of the fuel tank 11 is small even if the fuel tank 11 is normal, and step 1021 disables the fault diagnostic routine. If $FE_2 \leqq FE_{20}$, the routine terminates this time after setting the flag KE to 1 to indicate that the determination of whether the fault diagnosis can be carried out is complete at step 1023.

In this way, if the fuel consumption $FE_1$ in, for example, the five minutes after the start of the engine is too small, or if the fuel consumption $FE_2$ in a period between, for example, 5 and 20 minutes after the start of the engine is too large, the fault diagnosis is disabled to prevent an incorrect diagnosis.

The reference values used for testing the fuel consumption values $FE_1$ and $FE_2$ are the amount of consumed fuel that may affect the internal pressure of the fuel tank 11 when the fault diagnosis of any one of FIGS. 5 to 9 is carried out. Since the values of $FE_1$ and $FE_2$ vary in accordance with engine type and size of the fuel tank, it is preferable to determine these values by experiment using the actual engine and the fuel tank.

Another embodiment of the present invention will be explained with reference to FIG. 11. The embodiment of FIG. 10 disables a fault diagnosis if fuel consumption after the engine is started meets the condition for disabling the diagnosis. However, when fuel consumption meets the condition for disabling the diagnosis, i.e., when a change in the internal pressure of the fuel tank 11 is too small to carry out a diagnosis, there is only the possibility that the fuel tank 11 that is actually normal is diagnosed as abnormal. In this case, there is no possibility that the fuel tank 11 that is actually failed is diagnosed as normal. Accordingly, even if the diagnosis disabling condition is met, it is possible to consider that the fuel tank 11 is normal when it is diagnosed as normal.

In this embodiment, the amount of consumed fuel is used as a parameter for determining the reliability of a result (the flag FX) of the fault diagnosis of any one of FIGS. 5 to 9, and the value of a failure flag KX is fixed based on this parameter.

Figure 11:
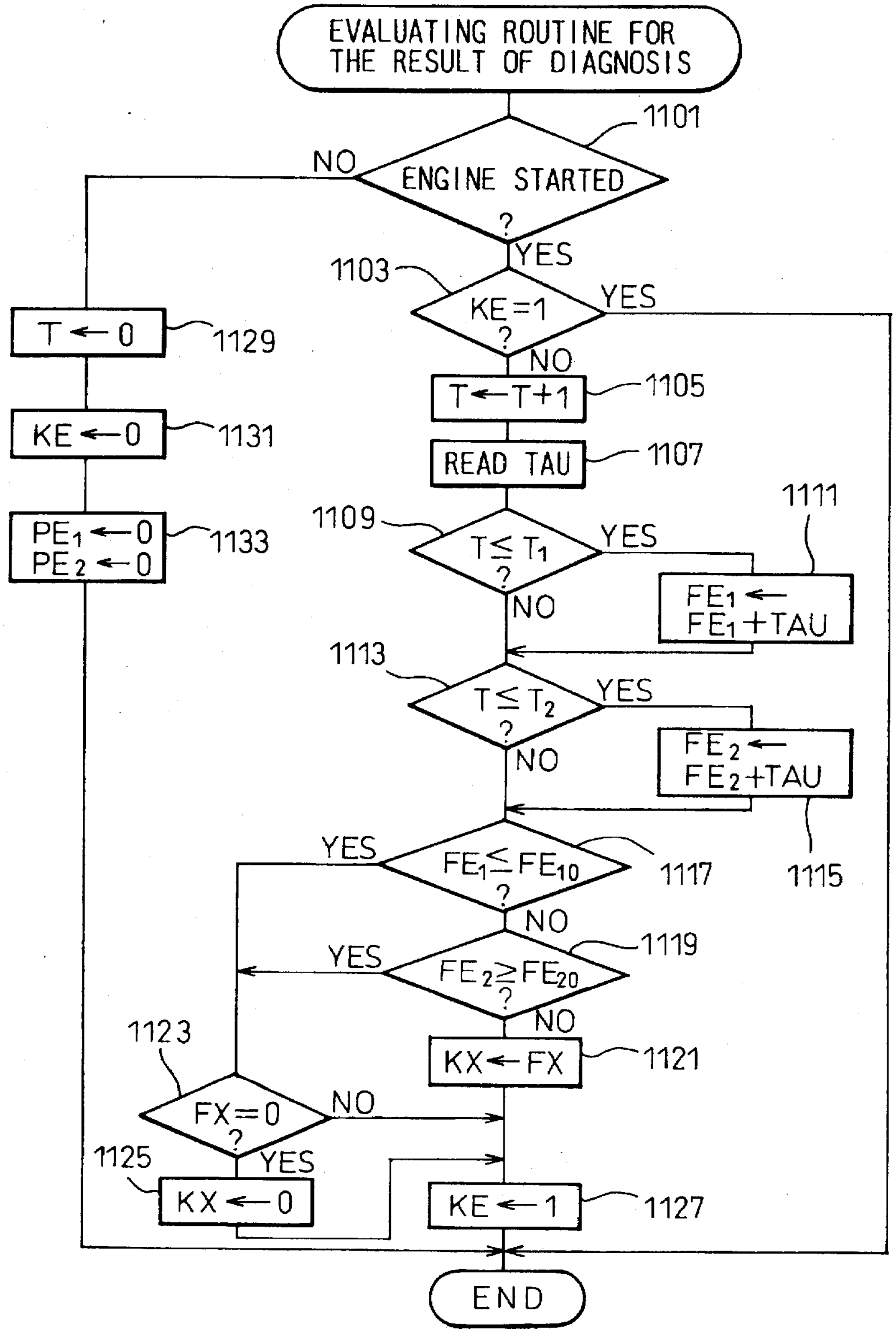
FIG. 11 is a flowchart showing a routine for evaluating the result of a fault diagnosis according to an embodiment of the present invention.

Similarly to FIG. 10, steps 1109 to 1115 of FIG. 11 calculate a fuel consumption $FE_1$ until time $T_1$ has elapsed after the start of the engine as well as a fuel consumption $FE_2$ in a period between $T_1$ and $T_2$. After the time $T_2$ has elapsed, step 1117 determines if $FE_1 \leqq FE_{10}$, and step 1119 determines if $FE_2 \geqq FE_{20}$. If both of these conditions are met, the reliability of a result of the fault diagnosis of any one of FIGS. 5 to 9 is high, and therefore, the final failure flag KX is set according to the failure flag FX set by the fault diagnosis of any one of FIGS. 5 to 9.

If any one of the conditions of steps 1117 and 1119 is not met, step 1123 determines whether the flag FX set by the fault diagnosis is 0 (normal). If FX=0 (normal), the final failure flag KX is set to 0 (normal). If FX=1 (abnormal) in step 1123, the reliability of this result is low, and therefore, the final failure flag is not set. Instead, step 1127 sets a flag KE to 1, and the routine terminates. This embodiment employs the flag FX as a temporary failure flag and the final failure flag KX as a flag to control an alarm.

Instead of disabling the fault diagnosis whenever the diagnostic conditions are not met, in this embodiment, the reliability of a result of the diagnosis is checked according to the fuel consumption values $FE_1$ and $FE_2$, to thereby increase the chances of finding that the fuel tank 11 is normal.

Another embodiment of the present invention will be explained with reference to FIG. 12.

As explained in the embodiments of FIGS. 10 and 11, a change in the internal pressure of the fuel tank 11 depends on the fuel consumption of the engine. Accordingly, if the failure determination parameter (for example $\Delta P_0$ of FIG. 7) is constant, an incorrect diagnosis will occur. To avoid the problem, this embodiment changes the failure determination parameter according to the fuel consumption.

Figure 12:
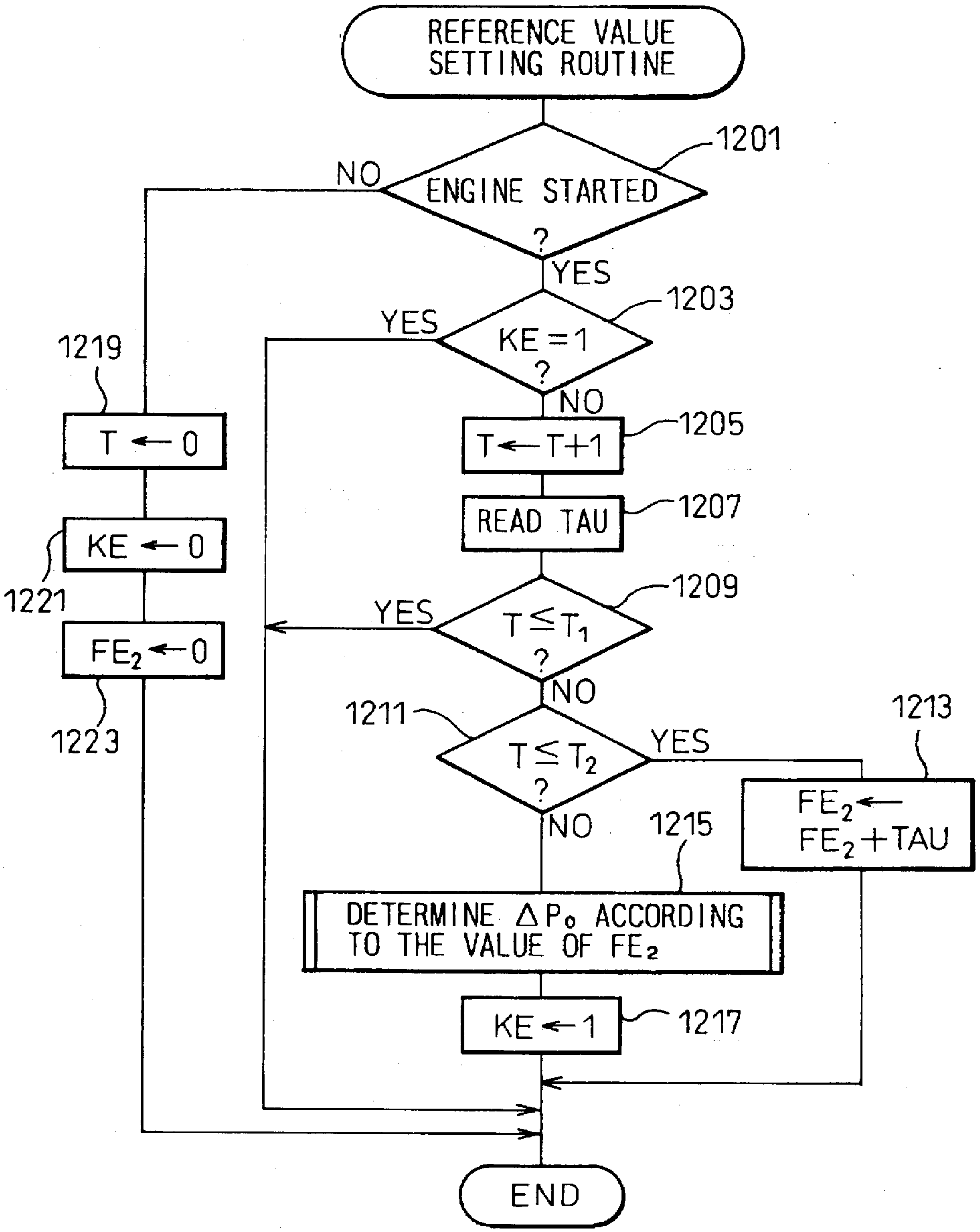
FIG. 12 is a flowchart showing a fault diagnostic routine according to an embodiment of the present invention.

FIG. 12 is a flowchart showing the embodiment. This embodiment employs the fault diagnosis of FIG. 7. The reference value $\Delta P_0$ of step 719 of FIG. 7 is changed according to the fuel consumption of the engine.

Steps 1201 to 1213 calculate only a fuel consumption $FE_2$ between time $T_1$ and time $T_2$ after the engine is started. After the time $T_2$, step 1215 calculates the reference value $\Delta P_0$ of FIG. 7 according to the fuel consumption $FE_2$.

The routine of FIG. 7 determines whether the fuel tank 11 is normal according to the difference between the lowest pressure $P_{MIN}$ and the highest pressure $P_{MAX}$ that occur when the internal pressure of the fuel tank 11 decreases and increases (FIG. 6) after the start of the engine. If the fuel consumption $FE_2$ in a period between $P_{MIN}$ and $P_{MAX}$ is large, the difference between $P_{MAX}$ and $P_{MIN}$ is small even if the fuel tank 11 is normal. Accordingly, step 1215 of FIG. 12 sets the reference value $\Delta P_0$ for the difference between $P_{MAX}$ and $P_{MIN}$ according to the fuel consumption $FE_2$, to correctly carry out the fault diagnosis. $\Delta P_0$ is set at smaller value as the $FE_2$ increases, and in practice, the optimum relationship between $FE_2$ and $\Delta P_0$ is determined by experiment using the engine.

Another embodiment of the present invention will be explained. The embodiments of FIGS. 10 to 12 consider the possibility of an incorrect diagnosis due to a fluctuation in the amount of consumed fuel. The internal pressure of the fuel tank 11 is influenced not only by the fuel consumption but also by other disturbances. For example, the internal pressure of the fuel tank 11 changes according to a change in the temperature of the wall of the fuel tank. If the temperature of the fuel tank wall decreases during a fault diagnosis, evaporated fuel will condense on the fuel tank wall and, thereby the internal pressure of the fuel tank decreases. If a decrease in the temperature of the fuel tank wall is large, the internal pressure of the fuel tank will not increase in a period in which it should increase even if the fuel tank is normal. Then, any one of the fault diagnoses of FIGS. 5 to 9 may incorrectly determine that the fuel tank has failed even if it is actually normal.

To avoid this problem, the embodiment detects the temperature of the fuel tank wall after the engine is started, and if a change in the temperature is greater than a reference value, the routine disables a fault diagnosis. Detection of the temperature of the fuel tank wall according to the embodiment will be explained.

The temperature of the fuel tank wall may directly be detected by a temperature sensor attached thereto. This, however, is not practical. The embodiment indirectly detects a change in the temperature of the fuel tank wall. The temperature of the fuel tank wall changes mainly due to (1) a change in ambient temperature and (2) rain. Especially, when it is raining, splashes from the road greatly cool the fuel tank even if the ambient temperature is unchanged. Accordingly, the embodiment detects a change in the ambient temperature and rain, to estimate a change in the temperature of the fuel tank wall.

Figure 13:
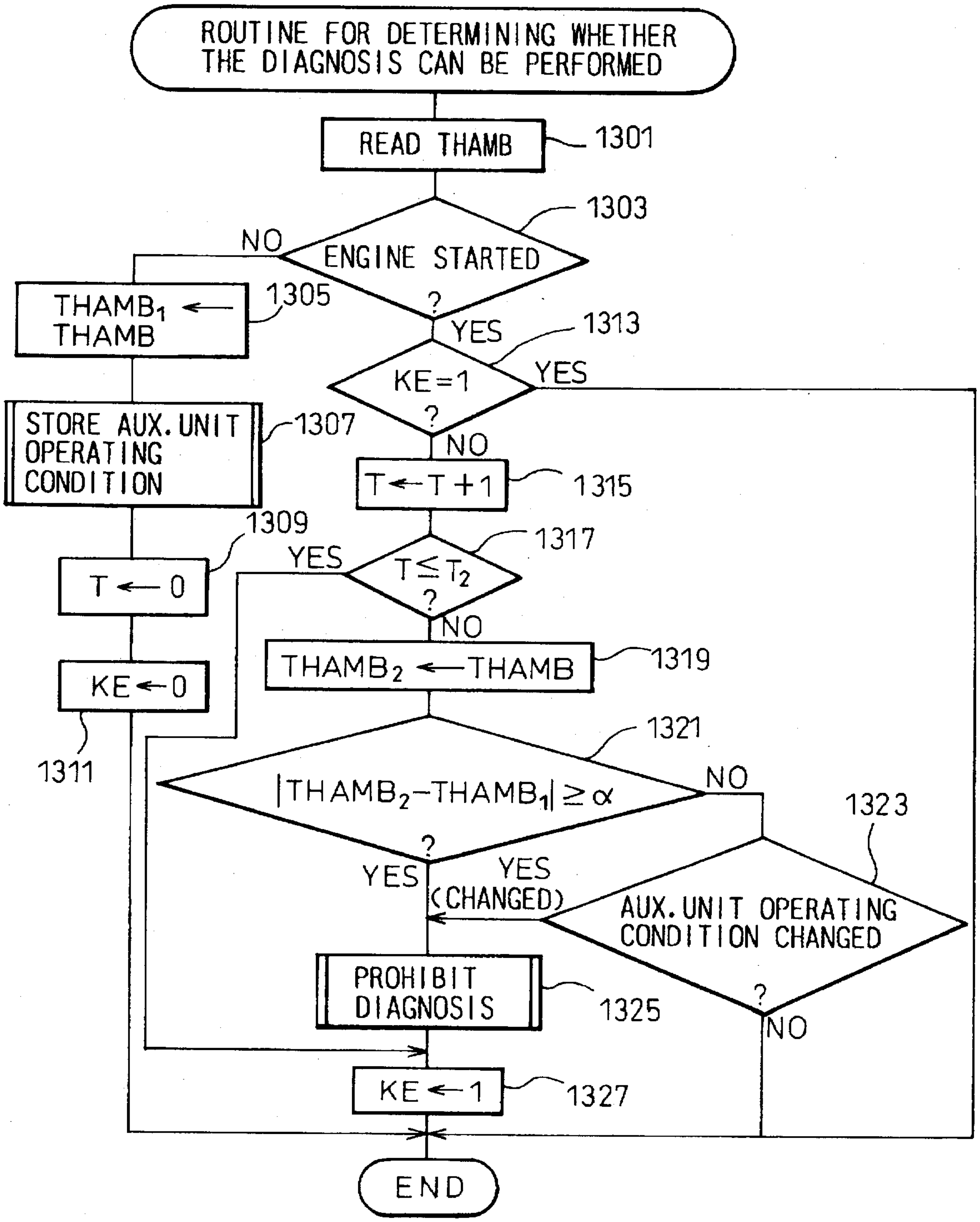
FIG. 13 is a flowchart showing a fault diagnostic routine according to an embodiment of the present invention.

FIG. 13 is a flowchart showing a routine for determining whether a fault diagnosis must be carried out, according to the temperature of the fuel tank wall. The routine is carried out by the control circuit 20 at regular intervals.

In FIG. 13, at step 1301, an ambient temperature THAMB is read from an ambient temperature sensor. Though a separate sensor for detecting an ambient temperature is provided in this embodiment, an intake air temperature sensor disposed in the airflow meter 12 which is used for calibrate the intake air amount may be used for detecting the ambient temperature under a certain conditions.

Step 1303 determines whether the engine has been started. If not, step 1305 stores the ambient temperature detected by step 1301 as $THAB_1$. Step 1307 stores the operating states (ON/OFF states) of auxiliary units such as an air conditioner, headlights, and wipers that are turned ON/OFF according to rain or a change in the ambient temperature. Steps 1309 and 1311 reset a counter T and flag KE to 0, respectively. The functions of the counter T and flag KE are the same as those of FIG. 10.

If the engine is started in step 1303, step 1313 checks the flag KE to see if the determination of whether the fault diagnosis must be carried out is complete. If it is not complete (KE=0), step 1315 increments the counter T by one.

Step 1317 determines whether the value of the counter T reaches a predetermined value $T_2$, which corresponds to, for example, about 20 minutes after the start of the engine. If the counter T is before $T_2$, the ambient temperature THAMB read in step 1301 is stored as $THAMB_2$. Step 1321 determines whether the difference between $THAMB_1$ and $THAMB_2$ is greater than a reference value α. If $|THAMB_2-THAMB_1| \geqq \alpha$, a change in the temperature during a fault diagnosis is large, and therefore, an incorrect diagnosis will occur due to a change in the temperature of the fuel tank wall. Accordingly, step 1325 disables the fault diagnosis of any one of FIGS. 5 to 9. If the diagnosis has already been done, the result thereof is invalidated.

If a change in the ambient temperature is small in step 1321, step 1323 compares the operating conditions of the auxiliary units with those stored in step 1307. If any one of the operating conditions has been changed, for example, if the wipers have been changed from an OFF state to an ON state, this means that it is raining and the temperature of the fuel tank wall has changed during the fault diagnosis, and therefore, an incorrect diagnosis may be made. Accordingly, similarly to the case of a change in the ambient temperature, step 1325 disables the fault diagnosis.

In this way, the fault diagnosis is disabled when a change in the temperature of the fuel tank wall is large, to thereby prevent an incorrect diagnosis due to a change in the ambient temperature or rain.

The above embodiment detects the ambient temperature with the separate ambient temperature sensor. Instead, the intake air temperature sensor provided for the airflow meter in the intake duct may be used. Namely, an intake air temperature is used as an ambient temperature. In this case, an error between the ambient temperature and the intake air temperature must be small. To achieve this, only when the engine is started at a low temperature, i.e., only when the difference between the temperature of engine cooling water and the intake air temperature is less than, for example, five degrees centigrade and the temperature of the engine cooling water is below, for example, 40 degrees centigrade, step 1305 stores the intake air temperature as $THAMB_1$. Further, when the automobile is traveling at more than, for example, 40 Km/h the intake air temperature may be used as $THAMB_2$. This eliminates the necessity to provide a separate ambient temperature sensor.

Another embodiment of the present invention will be explained. The fault diagnosis of any one of FIGS. 5 and 9 uses the internal pressure of the fuel tank 11 detected by the pressure sensor 30 as it is (FIG. 5), or the output of the pressure sensor 30 is integrated (FIG. 9), to diagnose the fuel tank.

A result of the diagnosis is affected not only by the amount of consumed fuel or a change in the temperature of the fuel tank wall but also by the tolerance of the pressure sensor 30.

Figure 14:
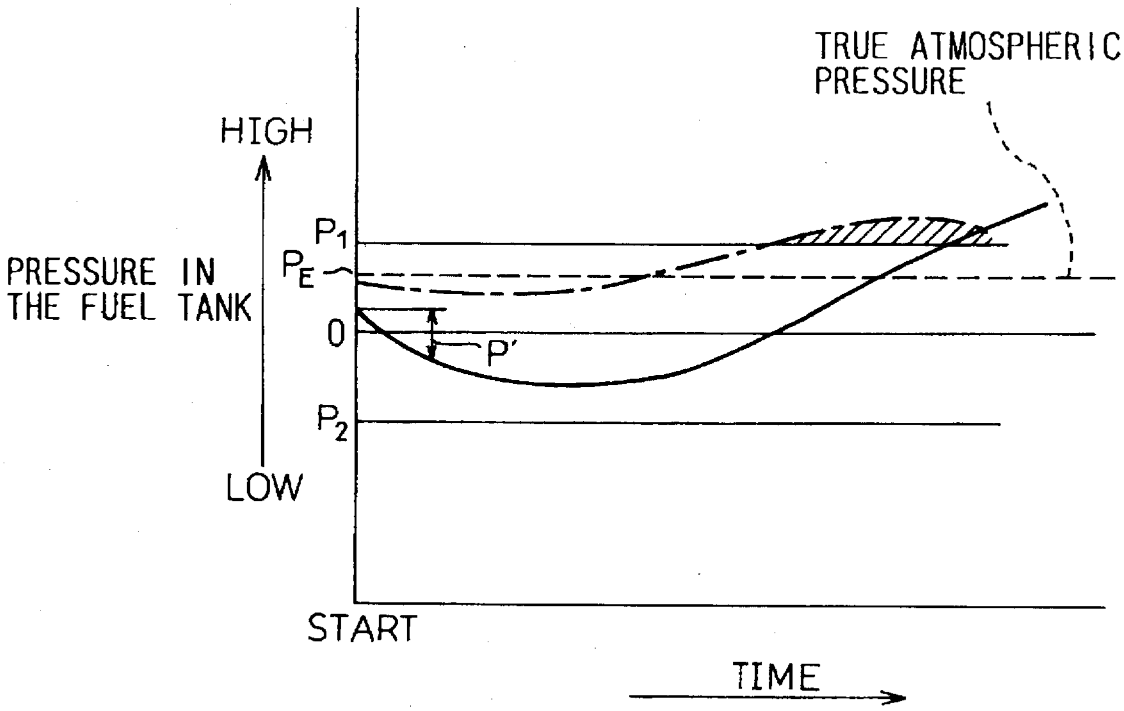
FIG. 14 shows a fault diagnosis of the evaporated fuel purging system according to an embodiment of the present invention.

This will be explained with reference to the fault diagnosis of FIG. 5. FIG. 14 is a drawing similar to FIG. 3 which illustrates a change in the pressure of the fuel tank 11 after the engine is started. In FIG. 14, a dot-and-dash line represents a change in the internal pressure of the fuel tank 11 having a leak, and a solid line represents the same of the fuel tank 11 having no leak. The vertical axis in FIG. 14 indicates the output of the pressure sensor 30, and a broken line indicates true atmospheric pressure. There is an error between the output of the pressure sensor 30 and the true pressure. The detection accuracy of the pressure sensor 30 usually involves an error (tolerance). The error between the output of the pressure sensor 30 and the true pressure is, at the maximum, equal to the tolerance. If the pressure sensor 30 involves a positive error $P_E$ as shown in FIG. 14, the pressure sensor 30 provides the positive pressure $P_E$ when the internal pressure of the fuel tank 11 is equal to the atmospheric pressure.

When the fuel tank 11 has a leak, the internal pressure of the fuel tank 11 stays around the atmospheric pressure after the start of the engine, as indicated with the dot-and-dash line in FIG. 14. In this case, the output of the pressure sensor fluctuates around the value PE. At this time, the difference between a positive reference value $P_1$ and the value $P_E$ is small when diagnosing the fuel tank 11 according to the routine of FIG. 5. Although the internal pressure of the fuel tank 11 actually stays around the atmospheric pressure, the output of the pressure sensor 30 will exceed the reference value $P_1$ as indicated by a hatched part of FIG. 14. Then, the fuel tank 11, which has failed, is determined as being normal due to the tolerance of the pressure sensor 30. Not only the fault diagnostic method of FIG. 5 but also the method of FIG. 9 that integrates changes in the pressure of the fuel tank have the same problem when the output of the pressure involves an error due to the measurement tolerance.

To prevent an incorrect diagnosis due to the measurement tolerance of the pressure sensor, this embodiment employs the difference (P' in FIG. 14) between the output of the pressure sensor 30 at the start of the engine and the output of the same after the engine is started, instead of the output of the pressure sensor 30. The difference between the internal pressures of the fuel tank 11 detected at and after the start of the engine does not include a detection error due to the tolerance of the pressure sensor, and therefore, it avoids an incorrect diagnosis due to the tolerance.

Figure 15:
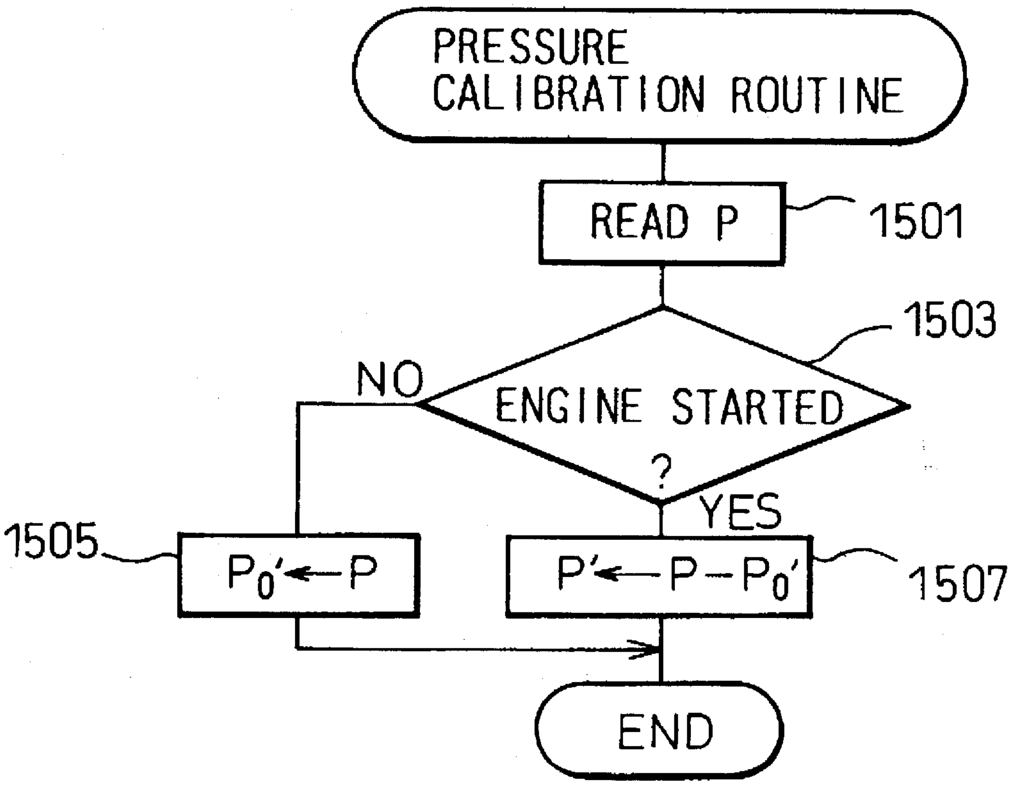
FIG. 15 is a flowchart showing a routine for calibrating a detection error of a pressure sensor according to an embodiment of the present invention.

FIG. 15 is a flowchart showing a routine for calculating the pressure difference P'. The routine is carried out at regular intervals that are shorter than those of the routines of FIGS. 5 and 9.

Step 1501 reads an internal pressure P of the fuel tank 11 detected by the pressure sensor 30. Step 1503 determines whether the engine has completely been started. If not, step 1505 stores, as $P_0'$, the pressure P in the RAM 23 of the control circuit 20. Until the engine has started, the value $P_0'$ is updated. After the engine has started, the value $P_0'$ represents the internal pressure of the fuel tank 11 at the start of the engine.

Step 1507 calculates the difference betweens the value P read in step 1501 and the value $P_0'$ stored in the RAM 23. The difference is stored as P' in the RAM 23. Instead of directly reading the output of the pressure sensor 30 as in steps 509 and 909 of the routines of FIGS. 5 and 9, the routine of FIG. 15 reads the value P' from the RAM 23. This results in eliminating the influence of the tolerance of the pressure sensor 30 that is unavoidable in the fault diagnosis of any one of FIGS. 5 to 9, to thereby correctly carry out the fault diagnosis.

Another embodiment of fault diagnosis which is different from those of FIGS. 5 to 9 will be explained.

Any one of the fault diagnoses of FIGS. 5 to 9 employs a change in the internal pressure of the fuel tank 11 after the engine is started, to diagnose the fuel tank. Namely, any one of the diagnoses of FIGS. 5 to 9 must continuously measure the internal pressure of the fuel tank 11 for a given period. Accordingly, the diagnoses of FIGS. 5 to 9 are easily influenced by disturbance such as the temperature of the fuel tank wall and a change in the amount of consumed fuel during the period.

To avoid this problem, this embodiment carries out a fault diagnosis separately from the diagnosis performed by any of FIGS. 5 to 9, based on only the internal pressure of the fuel tank 11 at the start of the engine. If the fuel tank 11 has a leak, the internal pressure of the fuel tank 11 is about atmospheric pressure during the stoppage of the engine, and at the start of the engine, the difference between the internal pressure of the fuel tank 11 and atmospheric pressure becomes very small. It is possible, therefore, to determine that the fuel tank has no leak if the internal pressure of the fuel tank 11 is above a positive reference pressure or below a negative reference pressure at the start of the engine. Even if the fuel tank 11 is normal, the internal pressure of the fuel tank may be about atmospheric pressure due to ambient temperature. Accordingly, it is not possible to determine that the fuel tank has failed even when the internal pressure of the fuel tank at the start of the engine stays around atmospheric pressure. If the internal pressure of the fuel tank at the start of the engine is above the positive reference pressure or below the negative reference pressure, this embodiment determines that the fuel tank 11 is normal and does not carries out further diagnosis. Only when the internal pressure of the fuel tank does not meet the above conditions at the start of the engine, i.e., only when it is not possible to determine that the fuel tank is normal at the start of the engine, this embodiment carries out any one of the fault diagnoses of FIGS. 5 to 9 after the start of the engine. In this way, this embodiment diagnoses the fuel tank 11 at the start of the engine, and if the fuel tank 11 is normal, carries out no further diagnosis. Accordingly, the diagnosis of the embodiment is hardly affected by disturbances.

Figure 16:
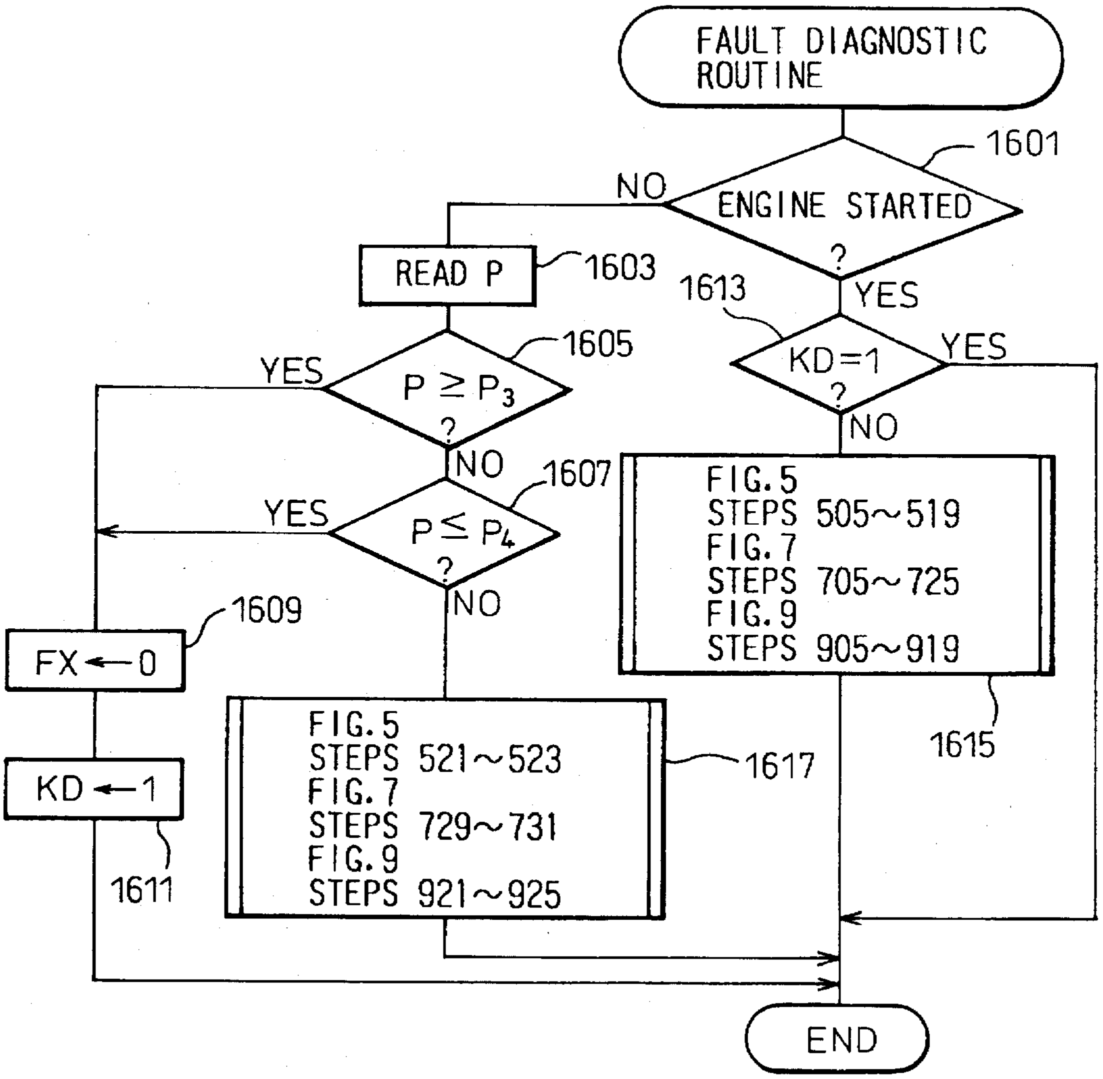
FIG. 16 is a flowchart showing a fault diagnostic routine according to an embodiment of the present invention.

FIG. 16 is a flowchart showing a fault diagnostic routine of the embodiment. This flowchart is made by adding steps

1603 to 1611 to the flowcharts of FIGS. 5, 7, and 9. Only these additional steps will be explained.

Before the engine has started in step 1601, step 1603 reads an internal pressure P of the fuel tank 11 through the pressure sensor 30. If the pressure P is above a reference positive value $P_3$ in step 1605, or if it is below a reference negative value $P_4$ in step 1607, step 1609 sets a failure flag FX to 0 (normal), and step 1611 sets a diagnosis completion flag KD to 1.

If it is determined that the fuel tank is normal at the start of the engine, the diagnosis completion flag KD is set to 1, so that no further diagnosis is carried out.

Only when steps 1603 to 1607 do not determine that the fuel tank is normal, steps 1615 and 1617 are carried out after the start of the engine to determine whether the fuel tank is normal according to any one of the methods in FIGS. 5, 7, and 9. The pressure $P_3$ is set to, for example, about 0.3 KPa and $P_4$ to about −0.3 KPa.

The relationship between the tolerance of the pressure sensor 30 and the valve opening pressures of the internal pressure control valve 16, pressure equalizing valve 17, and atmospheric valve 18 (FIG. 1) will be explained with reference to the fault diagnosis of FIG. 16.

The internal pressure of the fuel tank 11 is always maintained in the range of {atmospheric pressure+$\Delta P_A$} to {atmospheric pressure−($\Delta P_B$+$\Delta P_C$)} by the valves 16 to 18, etc. Namely, the internal pressure of the fuel tank 11 never exceeds {atmospheric pressure+$\Delta P_A$} or never drops below {atmospheric pressure−($\Delta P_B$+$\Delta P_C$)}. When diagnosing the fuel tank according to a change in the pressure of the fuel tank in a given period after the start of the engine according to any one of the diagnoses of FIGS. 5 to 9, the important matter is the relationship between the reference values for a change in the pressure of the fuel tank and the settings of the opening pressures of the valves.

Figure 17A:
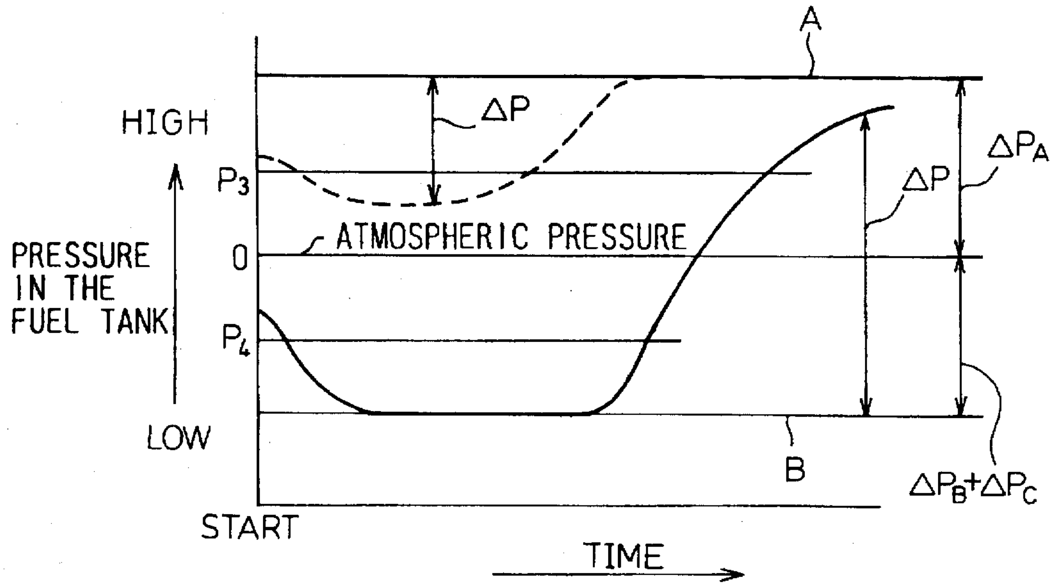
FIGS. 17A and 17B are drawings explaining the setting of the valve opening pressure of a valve of the evaporated fuel purging system.

FIG. 17A is a drawing similar to FIG. 3 which shows a change in the internal pressure of the fuel tank after the engine has started when the fuel tank 11 is normal. A solid line in FIG. 17A indicates the pressure change in the fuel tank after the engine is cold started, and a broken line indicates the same after the engine is hot started. A line A indicates a maximum pressure in the fuel tank 11 determined by the valve opening pressure of the internal pressure control valve 16, and a line B indicates a minimum pressure in the fuel tank 11 determined by the set pressures of the pressure equalizing valve 17 and atmospheric valve 18.

The embodiment of FIG. 7 determines that the fuel tank has failed if a change (ΔP of FIG. 17A) in the internal pressure of the fuel tank in a given period after the start of the engine is smaller than the reference value $\Delta P_0$. If the engine is started at a high temperature as indicated by the broken line of FIG. 17A, the internal pressure of the fuel tank is high at the start of the engine so that a small increase in the internal pressure of the fuel tank will open the internal pressure control valve 16. In this case, even if the fuel tank is normal, the change ΔP is too small to determine that the fuel tank is normal. If the engine is started at a low temperature, the internal pressure of the fuel tank after the start of the engine may be far lower than atmospheric pressure. Accordingly, a small drop in the internal pressure of the fuel tank may open the valves 17 and 18. Namely, a decrease in the internal pressure of the fuel tank is too small, and therefore, the pressure change ΔP (the solid line of FIG. 17A) is insufficient.

The routine of FIG. 16 immediately determines that the fuel tank 11 is normal if the internal pressure of the fuel tank 11 at the start of the engine is greater than the positive reference pressure $P_3$ or below the negative reference pressure $P_4$. Therefore, the possibility of an incorrect diagnosis is relatively low in this method even when the pressure change ΔP is small. However, even in this method, there is the possibility of an incorrect diagnosis.

For example, when the internal pressure of the fuel tank 11 at the start of the engine is slightly lower than $P_3$ or slightly above $P_4$ (FIG. 17A), the fuel tank will not be determined as being normal at the start of the engine. After the engine is started, the fuel tank 11 is determined as being abnormal if the pressure change ΔP (FIG. 17A) is relatively small. In this way, an incorrect diagnosis will occur depending on the relationship between the opening pressures of the valves 16, 17, and 18 and the reference value $\Delta P_0$.

As is apparent in FIG. 17, the settings of the opening pressures of the valves must allow the pressure change $\Delta P_0$ from the reference values $P_3$ and $P_4$.

Namely, the valve opening pressure $\Delta P_A$ of the internal pressure control valve 16 must allow a pressure increase of $\Delta P_0$ from the positive reference value $P_3$ ($\Delta P_A \geqq P_3+\Delta P_0$). The valve opening pressures $\Delta P_B$ and $\Delta P_C$ of the pressure equalizing valve 17 and atmospheric valve 18, respectively, must allow a pressure decrease of $\Delta P_0$ from the negative reference value $P_4$ ($\Delta P_B+\Delta P_C \geqq P_4-\Delta P_0$).

Figure 17B:
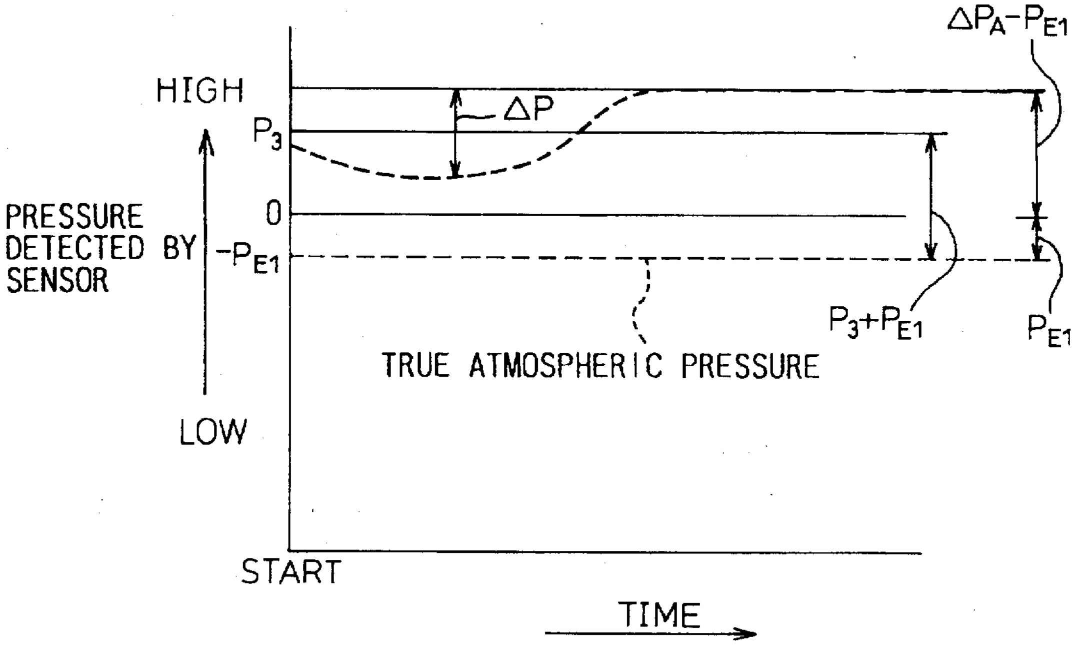

The error in the measurement of the pressure sensor 30 will be considered. The pressure sensor 30 has tolerance. Assume that the pressure sensor 30 involves a positive tolerance of $PE_1$ as shown in FIG. 17B (i.e., the tolerance by which the pressure sensor provides a pressure of $-PE_1$ when the internal pressure of the fuel tank 11 is equal to atmospheric pressure). In this case, when the internal pressure of the fuel tank 11 detected by the pressure sensor 30 is a positive value of $P_3$, a true internal pressure will be $P_3+PE_1$ at the maximum. In this case, the valve opening pressure $\Delta P_A$ of the internal pressure control valve 16 must be increased by $P_E$ corresponding to the tolerance to allow a pressure increase of $\Delta P_0$. A negative tolerance of $PE_2$ of the pressure sensor 30 must have the same relationship with respect to the opening pressure of $\Delta P_B+\Delta P_C$ of the valves 17 and 18.

Accordingly, the opening pressures $\Delta P_A$, $\Delta P_B$, and $\Delta P_C$ of the valves 16, 17, and 18 must have the following relationships with respect to the reference values $P_3$, $P_4$, and $\Delta P_0$ and the positive and negative tolerance $PE_1$ and $PE_2$ of the pressure sensor 30:

$$\Delta P_A \geqq P_3+\Delta P_0+PE_1$$

$$\Delta P_B+\Delta P_C \geqq P_4-\Delta P_0-PE_2$$

This embodiment sets the opening pressures of the valves 16, 17, and 18 as explained above, to make a fault diagnosis free from the tolerance of the pressure sensor 30 to correctly diagnose the fuel tank 11.

Another method of the present invention for canceling the influence of the tolerance of the pressure sensor 30 on a fault diagnosis will be explained. The above embodiment sets the opening pressures of the valves in consideration of the tolerance of the pressure sensor, to avoid the influence of the tolerance on a diagnosis. On the other hand, this embodiment employs the pressure sensor 30 to measure atmospheric pressure and uses the atmospheric pressure to calibrate the output of the pressure sensor 30, to thereby correctly measure the internal pressure of the fuel tank 11.

As explained above, the pressure sensor 30 detects a pressure difference with respect to atmospheric pressure, and the output thereof includes an error. This error is easily found by actually measuring atmospheric pressure with the pressure sensor 30. When the error of the pressure sensor 30 is a positive value of $PE_1$, atmospheric pressure measured with the pressure sensor 30 will be $-PE_1$. In this case, a true value of the internal pressure of the fuel tank 11 is a pressure P detected with the pressure sensor 30 minus the measured atmospheric pressure $-PE_1$, i.e., $P-(-PE_1)$.

This embodiment employs the pressure sensor 30 to measure an atmospheric pressure $P_E$ and subtracts the pressure $P_E$ from a pressure P of the fuel tank 11 measured with the pressure sensor 30, to provide a correct pressure of (P–PE), which is used to carry out the routine of FIG. 16. In this way, the embodiment employs (P–PE) instead of the detected value P, to carry out a fault diagnosis. This method cancels the detection error of the pressure sensor 30 and completely eliminates the influence of the error of the sensor from a fault diagnosis.

A method of measuring atmospheric pressure according to the embodiment will be explained. As explained with reference to FIG. 1, the three-way valve 31 switches the pressure sensor 30 to measure the pressure of the fuel tank 11 (vapor path 12) or the pressure of the canister 10 (purge path 14). When the purge control valve 15 is opened, the canister 10 is connected to the intake duct 2, so that the internal pressure of the canister 10 is equalized with the internal pressure of the intake duct 2. The internal pressure of the intake duct 2 is equal to atmospheric pressure when the engine is stopped. Accordingly, the embodiment switches the three-way valve 31 to the purge path 14 before the engine is started, i.e., before the start of cranking after the ignition switch is turned ON. At the same time, the embodiment opens the purge control valve 15 to introduce atmospheric pressure from the intake duct 2 into the purge path 14. As a result, the pressure sensor 30 measures the atmospheric pressure. After the measurement, the purge control valve 15 is closed, and the three-way valve 31 is switched to the vapor path 12, to measure the internal pressure of the fuel tank 11. In this way, the atmospheric pressure is easily measured with the pressure sensor.

If cranking is started just after the ignition switch is turned ON, a negative pressure is produced in the intake duct 2. In this case, the output of the pressure sensor 30 may deviate from a true value of atmospheric pressure. To solve this problem, atmospheric pressure is measured before or at the start of the engine with the pressure sensor 30. This atmospheric pressure is used to calibrate the internal pressure of the fuel tank, and then, a fault diagnosis is carried out. Further, when the ignition switch is turned OFF to stop the engine, the pressure sensor 30 is again used to measure atmospheric pressure. If this measurement is different from that made before or at the start of the engine over a given value, the result of the fault diagnosis is invalidated.

Another method of eliminating the influence of the tolerance of the pressure sensor 30 on a diagnosis will be explained. This embodiment compares an internal pressure $P_{CN}$ of the canister with an internal pressure P of the fuel tank at the start of the engine and if, there is no difference between $P_{ON}$ and P above a reference value, it determines that the fuel tank 11 has failed.

When the engine is stopped, the internal pressures of the canister 10 and fuel tank 11 change according to ambient temperature, the temperature of fuel in the fuel tank, etc. If the fuel tank 11 has no leak, the internal pressures of the canister 10 and fuel tank 11 are always different from each other.

If the atmospheric valve 18 of the canister 10 causes a leak, or if the housing of the canister 10 causes a leak, the internal pressure of the canister 10 shortly becomes equal to atmospheric pressure. Consequently, if the canister 10 has a leak and if the internal pressures of the canister 10 and fuel tank 11 are equal to each other, it is determined that the fuel tank 11 has a leak.

Next, assume that the atmospheric valve 18 has no leak and the canister 10 is completely closed by the purge control valve 15 will be considered.

Figure 18:
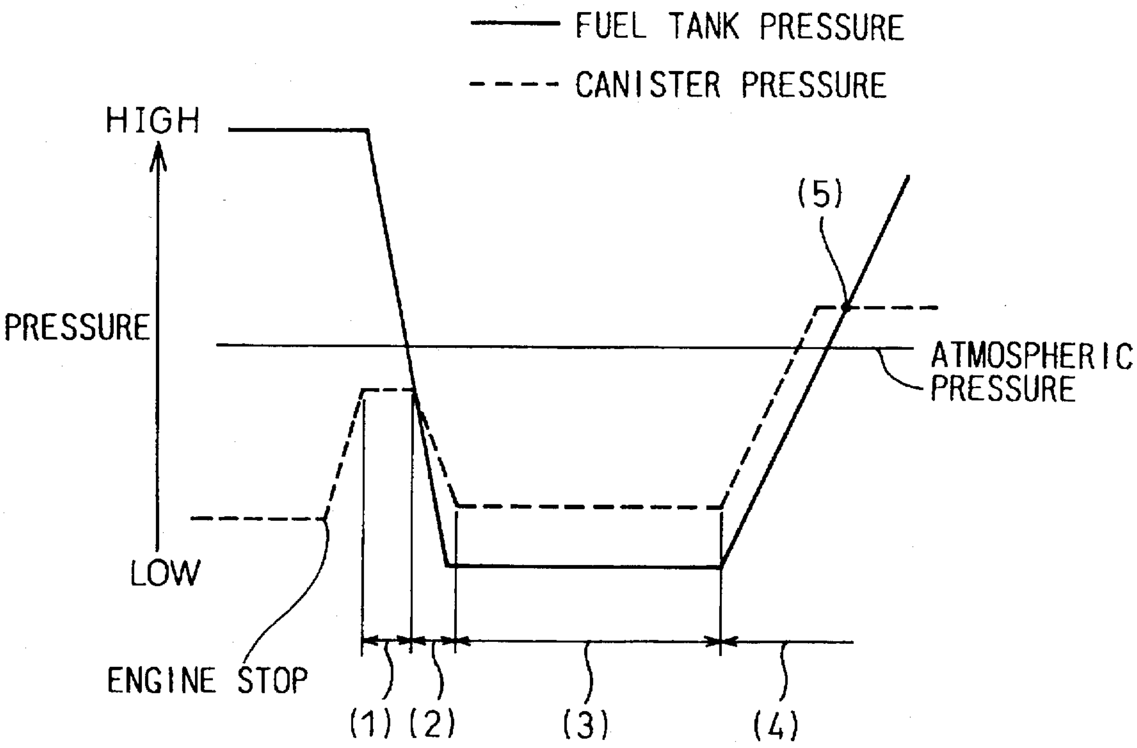
FIG. 18 shows a fault diagnosis of the evaporated fuel purging system according to an embodiment of the present invention.

FIG. 18 shows changes in the internal pressure of the canister 10 (a broken line) and in the internal pressure of the fuel tank 11 (a solid line) after the engine is stopped with both the canister 10 and fuel tank 11 having no leak.

The canister 10 holds a negative pressure equal to the valve opening pressure of the atmospheric valve 18 (the period indicated by (1) of FIG. 18). As the engine cools down, the internal pressure of the fuel tank 11 decreases. When the internal pressure of the fuel tank 11 becomes lower than that of the canister 10 by a set value, the pressure equalizing valve 17 opens to connect the fuel tank 11 to the canister 10 (the period indicated by (2) of FIG. 18). This is called a back purge. Under this state, the internal pressure of the fuel tank 11 is always lower than that of the canister 10.

When ambient temperature is low and when the fuel tank 11 has no leak during the back purge, the internal pressure of the fuel tank 11 is continuously lower than that of the canister 10 (the period indicated by (3) of FIG. 18). If ambient temperature increases, the internal pressures of the canister 10 and the fuel tank 11 increase (the period indicated by (4) of FIG. 18). At this time, the increases in the pressures of the canister 10 and fuel tank 11 are equal to each other, and therefore, the pressures are never equalized to each other while the ambient temperature is increasing during the back purge.

When the internal pressure of the canister 10 exceeds the valve opening pressure of the atmospheric release valve 19 (FIG. 2) due to an increase in the ambient temperature, the canister 10 communicates with the atmosphere. As a result, the internal pressure of the canister 10 is maintained at the valve opening pressure of the valve 19, which is about atmospheric pressure ((5) of FIG. 18). If the fuel tank 11 is normal during the back purge, the internal pressures of the fuel tank 11 and canister 10 are equalized with each other only at the point (5) of FIG. 18 when the pressures increase due to an increase in the ambient temperature. Unless the engine starts precisely at this timing, the pressures of the canister 10 and fuel tank 11 will never equal to each other.

Therefore, if the internal pressures of the canister 10 and fuel tank 11 are the same at the start of the engine, it will be determined that the fuel tank 11 has a leak.

Figure 19:
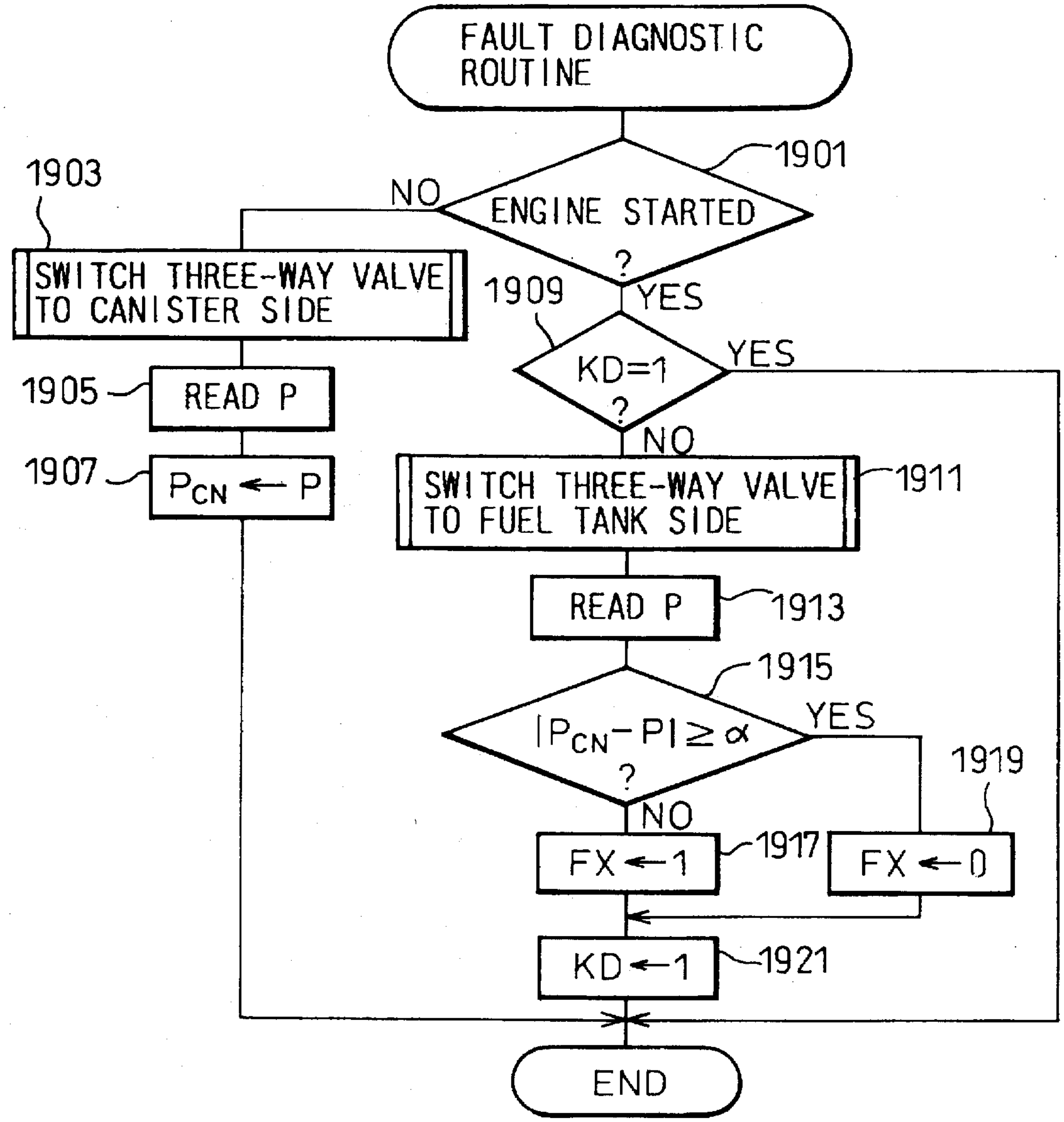
FIG. 19 is a flowchart showing a fault diagnostic routine according to an embodiment of the present invention.

FIG. 19 is a flowchart showing the fault diagnostic routine mentioned above. This routine is carried out by the control circuit 20 at regular intervals.

Step 1901 determines whether the engine has started. If not, step 1903 switches the three-way valve 31 (FIG. 1) to the canister 10, and step 1905 detects the internal pressure of the canister 10 by the pressure sensor 30. The detected pressure is stored as $P_{CN}$. After the engine is started, step 1911 switches the three-way valve 31 to the fuel tank 11, and step 1913 detects the internal pressure of the fuel tank 11 by the pressure sensor 30. Step 1915 determines whether the absolute value of the difference between the detected internal pressure P of the fuel tank 11 and the stored pressure $P_{CN}$ of the canister 10 is greater than a reference value α, which is a positive value close to 0. If $|P_{CN}-P|<\alpha$, $P_{CN}$ is nearly equal to P, and therefore, step 1917 sets a failure flag FX to 1 (failed). Step 1921 sets a diagnosis completion flag KD to 1, and the routine terminates this time. If $|P_{CN}-P|\geqq\alpha$, since it is considered that there is no failure, step 1919 sets the failure flag FX to 0 (normal), and the routine terminates after executing step 1921. When the completion flag KD is set to 1 at step 1921, the next routine directly terminates from step 1909, and step 1911 and the following steps are skipped over.

In this way, this embodiment compares the internal pressures of the canister 10 and fuel tank 11 detected by the same pressure sensor 30 with each other, to carry out a fault diagnosis, so that the detection error of the pressure sensor 30 is canceled to secure the correctness of the diagnosis.

Similarly to FIG. 16, this embodiment diagnoses the fuel tank 11 just after the start of the engine, so that disturbances such as fuel consumption and temperature change will not influence the diagnosis.

The routine of FIG. 19 most correctly diagnoses the fuel tank 11 when the back purge occurs during the stoppage of the engine. Accordingly, it may be determined during the operation of the engine whether the back purge will occur after the engine is stopped, according to the temperature of engine cooling water (for example, if the temperature of the cooling water is continuously high for a given period). The result of the determination is stored in a backup RAM that is capable of maintaining its memory even after the ignition switch is turned OFF. Only when the back purge was expected, is the above fault diagnosis carried out at the next start of the engine.

As explained above, according to the present invention, accuracy of the diagnosis of the fuel tank can be improved.

What is claimed is:

1. A fault diagnostic apparatus for an evaporative fuel purging system, comprising:

- a vapor path connecting a space above a fuel level in a fuel tank of an internal combustion engine to an intake duct of the engine;
- a purging unit disposed in the vapor path for purging evaporated fuel in the fuel tank into an intake duct through the vapor path;
- an internal pressure control valve arranged in the vapor path between the purge unit and the fuel tank, for opening when the internal pressure of the fuel tank increases above a predetermined pressure higher than atmospheric pressure, to thereby keep the internal pressure of the fuel tank below said predetermined pressure;
- pressure detecting means for detecting the internal pressure of the fuel tank;
- failure determining means for performing a determining operation for determining whether the fuel tank has failed according to the internal pressure of the fuel tank detected by the detecting means after the engine is started;
- fuel consumption detecting means for detecting the amount of fuel consumed by the engine after the start of the engine; and
- control means for controlling the determining operation of the determining means in accordance with the fuel consumption detected by the fuel consumption detecting means;

wherein said control means prohibits the failure determining means from performing the determining operation when the amount of fuel consumed by the engine within a given period after the engine starts is smaller than a predetermined lower limit.

2. A fault diagnostic apparatus according to claim 1, wherein said failure determining means calculates the value of a failure determination parameter based on the internal pressure of the fuel tank detected within a predetermined period after the engine starts and determines whether the fuel tank has failed by comparing the value of the failure determination parameter with a predetermined reference value, and wherein said control means changes the reference value in accordance with the amount of fuel consumed by the engine within a given period after the engine starts.

3. A fault diagnostic apparatus for an evaporative fuel purging system, comprising:

- a vapor path connecting a space above a fuel level in a fuel tank of an internal combustion engine to an intake duct of the engine;
- a pursing unit disposed in the vapor path for purging evaporated fuel in the fuel tank into an intake duct through the vapor path;
- an internal pressure control valve arranged in the vapor path between the purge unit and the fuel tank, for opening when the internal pressure of the fuel tank increases above a predetermined pressure higher than atmospheric pressure, to thereby keep the internal pressure of the fuel tank below said predetermined pressure;
- pressure detecting means for detecting the internal pressure of the fuel tank;
- failure determining means for performing a determining operation for determining whether the fuel tank has failed according to the internal pressure of the fuel tank detected by the detecting means after the engine is started;
- fuel consumption detecting means for detecting the amount of fuel consumed by the engine after the start of the engine; and
- control means for controlling the determining operation of the determining means in accordance with the fuel consumption detected by the fuel consumption detecting means;

wherein said control means prohibits the failure determining means from performing the determining operation when the amount of fuel consumed by the engine within a given period starting when a predetermined time has elapsed after the engine starts is higher than a predetermined upper limit.

4. A fault diagnostic apparatus for an evaporated fuel purging system, comprising:

- a vapor path connecting a space above a fuel level in a fuel tank of an internal combustion engine to an intake duct of the engine;
- a purging unit disposed in the vapor path for purging evaporated fuel in the fuel tank into an intake duct through the vapor path;
- an internal pressure control valve arranged in the vapor path between the purge unit and the fuel tank, for opening when the internal pressure of the fuel tank increases above a predetermined pressure higher than atmospheric pressure, to thereby keep the internal pressure of the fuel tank below said predetermined pressure;
- pressure detecting means for detecting the internal pressure of the fuel tank;
- failure determining means for performing a determining operation for determining whether the fuel tank has failed according to the internal pressure of the fuel tank detected by the pressure detecting means after the engine is started;
- temperature detecting means for detecting the temperature of a wall of the fuel tank; and prohibiting means for prohibiting said failure determining means from performing the determining operation when the wall temperature of the fuel tank changes more than a predetermined amount within a given period after the engine starts.

5. A fault diagnostic apparatus for an evaporative fuel purging system, comprising:

a vapor path connecting a space above a fuel level in a fuel tank of an internal combustion engine to an intake duct of the engine;

a purging unit disposed in the vapor path for purging evaporated fuel in the fuel tank into an intake duct through the vapor path;

valve means arranged in the vapor path between the purge unit and the fuel tank, for opening when the internal pressure of the fuel tank increases becomes a predetermined pressure, to thereby keep the internal pressure of the fuel tank within a predetermined pressure range;

pressure detecting means for measuring the internal pressure of the fuel tank;

failure determining means for performing a determining operation for determining whether the fuel tank has failed based on the internal pressure of the fuel tank measured by the pressure detecting means after the engine is started;

wherein said failure determining means performs a determining operation in such a manner that an error in the measurement of the internal pressure of the fuel tank due to a measurement tolerance of the pressure detecting means is corrected, wherein said valve means opens when the internal pressure of the fuel tank increases above a predetermined reference pressure higher than atmospheric pressure, to thereby keep the interval pressure of the fuel tank below said reference pressure, and said failure determining means determines whether the fuel tank has failed by comparing the internal pressure of the fuel tank detected at the start of the engine with the internal pressure of the fuel tank detected within a predetermined period after the engine starts.

6. A fault diagnostic apparatus for an evaporative fuel purging system, comprising:

a vapor path connecting a space above a fuel level in a fuel tank of an internal combustion engine to an intake duct of the engine;

a purging unit disposed in the vapor path for purging evaporated fuel in the fuel tank into an intake duct through the vapor path;

valve means arranged in the vapor path between the purge unit and the fuel tank, for opening when the internal pressure of the fuel tank becomes a predetermined pressure, to thereby keep the internal pressure of the fuel tank within a predetermined pressure range wherein, said valve means opens when the difference between the internal pressure of the fuel tank and atmospheric pressure becomes more than a predetermined amount, to thereby keep the pressure difference between the fuel tank and the atmosphere within the predetermined amount;

pressure detecting means for detecting a difference between the internal pressure of the fuel tank and the atmospheric pressure;

failure determining means for performing a determining operation for determining whether the fuel tank has failed based on the pressure difference measured by the pressure detecting means after the engine is started wherein said failure determining means comprises first determining means for determining whether the fuel tank has failed by comparing the pressure difference when the engine starts with a first reference value, and a second determining means for determining whether the fuel tank has failed by comparing an amount of change in the pressure difference within a predetermined period after the engine starts with a predetermined second reference value;

wherein said failure determining means performs a determining operation in such a manner that an error in the measurement of the internal pressure of the fuel tank due to a measurement tolerance of the pressure detecting means is corrected, wherein, said predetermined amount of the pressure difference at which the valve means opens is set at a larger value than a total of a measuring tolerance of said pressure detecting means and said first reference value and said second reference value.

7. A fault diagnostic apparatus for an evaporative fuel purging system, comprising:

a vapor path connecting a space above a fuel level in a fuel tank of an internal combustion engine to an intake duct of the engine;

a purging unit disposed in the vapor path for purging evaporated fuel in the fuel tank into an intake duct through the vapor path, said purge unit comprising a canister connected to the space above a fuel level in the fuel tank and to the intake duct of the engine by the vapor path for adsorbing the evaporated fuel from the fuel tank and for purging the adsorbed fuel into the intake duct, and a purge control valve for alternately opening and blocking the vapor path;

valve means arranged in the vapor path between the purge unit and the fuel tank, for opening when the internal pressure of the fuel tank increases becomes a predetermined pressure, to thereby keep the internal pressure of the fuel tank within a predetermined pressure range wherein said valve means opens when the difference between the internal pressure of the fuel tank and atmospheric pressure becomes more than a predetermined amount, to thereby keep the pressure difference within the predetermined amount;

pressure detecting means for detecting an internal pressure of the fuel tank and an internal pressure of the canister;

failure determining means for performing a determining operation for determining whether the fuel tank has failed based on the internal pressure of the fuel tank measured by the pressure detecting means after the engine is started wherein said failure determining means determines whether the fuel tank has failed by comparing the internal pressure of the fuel tank at the start of the engine with the internal pressure of the canister at the start of the engine;

wherein said failure determining means performs a determining operation in such a manner that an error in the measurement of the internal pressure of the fuel tank due to a measurement tolerance of the pressure detecting mean is corrected.

8. A fault diagnostic apparatus for an evaporative fuel purging system, comprising:

a vapor path connecting a space above a fuel level in a fuel tank of an internal combustion engine to an intake duct of the engine;

a purging unit disposed in the vapor path for purging evaporated fuel in the fuel tank into an intake duct through the vapor path;

valve means arranged in the vapor path between the purge unit and the fuel tank, for opening when the internal pressure of the fuel tank increases becomes a predetermined pressure, to thereby keep the internal pressure of the fuel tank within a predetermined pressure range;

pressure detecting means for sensing both an internal pressure of the fuel tank and an atmospheric pressure;

failure determining means for determining whether the fuel tank has failed by comparing the internal pressure of the fuel tank at the start of the engine with the atmospheric pressure;

wherein said pressure detecting means comprises a pressure sensor and a switching valve which selectively connects the pressure sensor to the space above the fuel level in the fuel tank and to the vapor path, and wherein said pressure detecting means detects the atmospheric pressure by connecting the pressure sensor to the vapor path before the engine is started.

9. A fault diagnostic apparatus for an evaporative fuel purging system, comprising:

a vapor path connecting a space above a fuel level in a fuel tank of an internal combustion engine to an intake duct of the engine;

a purging unit disposed in the vapor path for purging evaporated fuel in the fuel tank into an intake duct through the vapor path;

an internal pressure control valve arranged in the vapor path between the purge unit and the fuel tank, for opening when the internal pressure of the fuel tank increases above a predetermined pressure higher than atmospheric pressure, to thereby keep the internal pressure of the fuel tank below said predetermined pressure;

pressure detecting means for detecting an internal pressure of the fuel tank and an atmospheric pressure;

failure determining means for determining whether the fuel tank has failed based on the internal pressure of the fuel tank, wherein the failure detecting means determines that the fuel tank is normal when the internal pressure of the fuel tank detected by the detecting means before the engine starts is outside a predetermined pressure range, the predetermined pressure range extending from a predetermined lower limit to a predetermined upper limit.

* * * * *

UNITED STATES PATENT AND TRADEMARK OFFICE

CERTIFICATE OF CORRECTION

PATENT NO. : 5,679,890

DATED : October 21, 1997

INVENTOR(S) : Susumu SHINOHARA, et al.

It is certified that error appears in the above-indentified patent and that said Letters Patent is hereby corrected as shown below:

Column 8, line 40, change "$\Delta P_c$" to --$\Delta P_C$--.

Column 13, line 26, change "initializes" to --initialize--.

Column 16, line 19, change "calibrate" to --calibrating--.

Column 16, line 43, change "$THAMB_1$-/..." to --$THAMB_1$/--.

Column 18, line 56, change "carries" to --carry--.

Column 19, line 5, change "reference negative to -- negative reference--.

Column 19, line 6, change "reference positive" to --positive reference--.

Column 21, line 58, change "$P_{ON}$" to --$P_{CN}$--.

Column 22, line 8, delete "will be considered".

UNITED STATES PATENT AND TRADEMARK OFFICE

CERTIFICATE OF CORRECTION

PATENT NO. : 5,679,890

DATED : October 21, 1997

INVENTOR(S) : Susumu SHINOHARA, et al.

It is certified that error appears in the above-indentified patent and that said Letters Patent is hereby corrected as shown below:

Column 24, line 14, change "a pursing unit" to --a purging unit--.

Column 25, line 16, delete "increases".

Column 26, line 37, delete "increases".

Column 26, line 62, change "mean" to --means--.

Column 27, line 6, delete "increases".

Signed and Sealed this

Twelfth Day of January, 1999

*Attest:*

*Attesting Officer*

*Acting Commissioner of Patents and Trademarks*